US008532670B2

(12) United States Patent
Kim et al.

(10) Patent No.: US 8,532,670 B2
(45) Date of Patent: Sep. 10, 2013

(54) APPARATUS, METHOD, AND SYSTEM FOR SENSING SUPPRESSION FOR LOCATION-BASED APPLICATIONS

(75) Inventors: Kyu-Han Kim, Redwood City, CA (US); Zhenyun Zhuang, Atlanta, GA (US); Jatinder Pal Singh, Mountain View, CA (US)

(73) Assignee: Deutsche Telekom AG, Bonn (DE)

( * ) Notice: Subject to any disclaimer, the term of this patent is extended or adjusted under 35 U.S.C. 154(b) by 424 days.

(21) Appl. No.: 12/791,986

(22) Filed: Jun. 2, 2010

(65) Prior Publication Data

US 2011/0300875 A1 Dec. 8, 2011

(51) Int. Cl.
*H04W 24/00* (2009.01)
(52) U.S. Cl.
USPC .......... 455/456.1; 455/456.2; 455/456.3; 455/475; 455/572; 455/573; 455/574; 455/404.1; 455/404.2
(58) Field of Classification Search
USPC .......... 455/456.1, 456.2, 456.3, 475, 572, 455/573, 574, 404.1, 404.2
See application file for complete search history.

(56) References Cited

U.S. PATENT DOCUMENTS

| | | | |
|---|---|---|---|
| 5,491,486 A | 2/1996 | Welles, II et al. |
| 5,579,013 A | 11/1996 | Hershey et al. |
| 5,627,517 A | 5/1997 | Theimer et al. |
| 5,781,156 A | 7/1998 | Krasner |
| 5,825,327 A | 10/1998 | Krasner |
| 5,841,396 A | 11/1998 | Krasner |
| 5,884,214 A | 3/1999 | Krasner |
| 5,987,979 A | 11/1999 | Bryan |
| 5,991,692 A | 11/1999 | Spencer et al. |
| 6,016,119 A | 1/2000 | Krasner |
| 6,044,698 A | 4/2000 | Bryan |
| 6,061,018 A | 5/2000 | Sheynblat |
| 6,064,336 A | 5/2000 | Krasner |
| 6,067,044 A | 5/2000 | Whelan et al. |
| 6,067,460 A | 5/2000 | Alanara et al. |
| 6,104,340 A | 8/2000 | Krasner |

(Continued)

FOREIGN PATENT DOCUMENTS

| | | |
|---|---|---|
| EP | 0 894 683 A2 | 2/1999 |
| EP | 1 012 725 A1 | 6/2000 |

(Continued)

OTHER PUBLICATIONS

Abdesslem et al., Less is more: energy-efficient mobile sensing with senseless. In *MobiHeld '09: Proceedings of the 1st ACM workshop on Networking, systems, and applications for mobile handhelds*, pp. 61-62, New York, NY, USA, 2009. ACM.

(Continued)

*Primary Examiner* — Kamran Afshar
*Assistant Examiner* — Sayed T Zewari
(74) *Attorney, Agent, or Firm* — Leydig, Voit & Mayer, Ltd.

(57) ABSTRACT

A method is provided for managing a location sensing operation for location-based applications, including activating a first sensor disposed in the portable device so as to provide a location sensing operation requested by at least one location-based application. The method further includes periodically monitoring movement of the portable device by a second sensor disposed in the portable device, and suppressing the location sensing operation of the first sensor in accordance with the movement of the portable device detected by the second sensor.

18 Claims, 27 Drawing Sheets

(56) References Cited

U.S. PATENT DOCUMENTS

| | | | |
|---|---|---|---|
| 6,118,808 | A | 9/2000 | Tiemann et al. |
| 6,121,921 | A | 9/2000 | Ishigaki |
| 6,133,871 | A | 10/2000 | Krasner |
| 6,266,008 | B1 | 7/2001 | Huston et al. |
| 6,609,064 | B1 | 8/2003 | Dean |
| 6,882,274 | B2 | 4/2005 | Richardson et al. |
| 7,031,757 | B2 | 4/2006 | Schwengler et al. |
| 7,072,668 | B2 | 7/2006 | Chou |
| 7,095,312 | B2 | 8/2006 | Erario et al. |
| 7,113,127 | B1 | 9/2006 | Banet et al. |
| 7,130,664 | B1 | 10/2006 | Williams |
| 7,170,409 | B2 | 1/2007 | Ehrensvard et al. |
| 7,205,934 | B2 | 4/2007 | Hall |
| 7,317,418 | B2 | 1/2008 | Salkhi |
| 7,336,224 | B2 | 2/2008 | King et al. |
| 7,339,460 | B2 | 3/2008 | Lane et al. |
| 7,408,506 | B2 | 8/2008 | Miller |
| 7,409,188 | B2 | 8/2008 | Syrjarinne et al. |
| 7,571,857 | B2 | 8/2009 | Payne et al. |
| 7,574,217 | B1 | 8/2009 | Leung et al. |
| 7,642,921 | B2 | 1/2010 | Culter et al. |
| 7,642,958 | B2 | 1/2010 | Bernhardt et al. |
| 8,271,057 | B2* | 9/2012 | Levine et al. ................. 455/574 |
| 2004/0192352 | A1* | 9/2004 | Vallstrom et al. .......... 455/456.6 |
| 2005/0255874 | A1* | 11/2005 | Stewart-Baxter et al. . 455/550.1 |
| 2007/0049288 | A1 | 3/2007 | Lamprecht et al. |
| 2007/0117572 | A1 | 5/2007 | Adam et al. |
| 2007/0247359 | A1 | 10/2007 | Ghazarian |
| 2009/0005080 | A1* | 1/2009 | Forstall et al. ............. 455/456.3 |
| 2009/0131081 | A1* | 5/2009 | Abdel-Kader et al. .... 455/456.6 |
| 2010/0009643 | A1* | 1/2010 | Haartsen .................... 455/127.5 |
| 2010/0127926 | A1* | 5/2010 | Wang ....................... 342/357.09 |

FOREIGN PATENT DOCUMENTS

| | | |
|---|---|---|
| EP | 1 043 599 A2 | 10/2000 |
| GB | 2453001 A | 3/2009 |
| KR | 2008-0077098 A | 8/2008 |
| NL | 1022435 C2 | 7/2004 |
| WO | WO 97/14049 A2 | 4/1997 |
| WO | WO 97/44737 A1 | 11/1997 |
| WO | WO 02/03095 A1 | 1/2002 |
| WO | WO 2006/096670 A2 | 9/2006 |
| WO | WO 2008/052657 A1 | 5/2008 |
| WO | WO 2008/113083 A2 | 9/2008 |
| WO | WO 2008/131805 A1 | 11/2008 |
| WO | WO 2008/132232 A2 | 11/2008 |
| WO | WO 2009/010272 A1 | 1/2009 |

OTHER PUBLICATIONS

Anand et al., Self-tuning wireless network power management. In *MobiCom '03: Proceedings of the 9th annual international conference on Mobile computing and networking*, pp. 176-189, New York, NY, USA, 2003. ACM.

Ananthanarayanan et al., Startrack: a framework for enabling track-based applications. In *MobiSys '09: Proceedings of the 7th international conference on Mobile systems, applications, and services*, pp. 207-220, New York, NY, USA, 2009. ACM.

Azizyan et al., Surroundsense: mobile phone localization using ambient sound and light. *SIGMOBILE Mob. Comput. Commun. Rev.*, 13(1):69-72, 2009.

Brezmes et al., Activity recognition from accelerometer data on a mobile phone. In *IWANN '09: Proceedings of the 10th International Work-Conference on Artificial Neural Networks*, pp. 796-799, Berlin, Heidelberg, 2009. Springer-Verlag.

Campbell et al., Transforming the social networking experience with sensing presence from mobile phones. In *SenSys '08: Proceedings of the 6th ACM conference on Embedded network sensor systems*, pp. 367-368, New York, NY, USA, 2008. ACM.

Constandache et al., Enloc: Energy-efficient localization for mobile phones. In *Proceedings of IEEE INFOCOM Mini Conference*, Rio de Janeiro, Brazil, 2009.

Deshpande et al., Predictive methods for improved vehicular wifi access. In *MobiSys '09: Proceedings of the 7th international conference on Mobile systems, applications, and services*, pp. 263-276, New York, NY, USA, 2009. ACM.

Eisenman et al., The bikenet mobile sensing system for cyclist experience mapping. In *SenSys '07: Proceedings of the 5th international conference on Embedded networked sensor systems*, pp. 87-101, New York, NY, USA, 2007. ACM.

Gaonkar et al., Micro-blog: sharing and querying content through mobile phones and social participation. In *MobiSys '08: Proceeding of the 6th international conference on Mobile systems, applications, and services*, pp. 174-186, New York, NY, USA, 2008. ACM.

Gellersen et al., Multi-sensor context-awareness in mobile devices and smart artifacts. *Mob. Netw. Appl.*, 7(5):341-351, 2002.

Györbíró et al., An activity recognition system for mobile phones. *Mobile Netw. Appl.*, 14(1): 82-91,2009.

Hoh et al., Virtual trip lines for distributed privacy-preserving traffic monitoring. In *MobiSys '08: Proceeding of the 6th international conference on Mobile systems, applications, and services*, pp. 15-28, New York, NY, USA, 2008. ACM.

Hull et al., Cartel: a distributed mobile sensor computing system. In *SenSys '06: Proceedings of the 4th international conference on Embedded networked sensor systems*, pp. 125-138, New York, NY, USA, 2006. ACM.

Kang et al., Seemon: scalable and energy-efficient context monitoring framework for sensor-rich mobile environments. In *MobiSys '08: Proceeding of the 6th international conference on Mobile systems, applications, and services*, pp. 267-280, New York, NY, USA, 2008. ACM.

Lester et al., Sensing and modeling activities to support physical fitness. In *Proceedings of UbiComp '05*, Tokyo, Japan.

Lin et al., Energy-accuracy aware localization for mobile devices. In *Proceedings of ACM MobiSys '10*, San Francisco, California, USA.

Lu et al., Soundsense: scalable sound sensing for people-centric applications on mobile phones. In *MobiSys '09: Proceedings of the 7th international conference on Mobile systems, applications, and services*, pp. 165-178, New York, NY, USA, 2009. ACM.

Miluzzo et al., Sensing meets mobile social networks: the design, implementation and evaluation of the cenceme application. In *SenSys '08: Proceedings of the 6th ACM conference on Embedded network sensor systems*, pp. 337-350, New York, NY, USA, 2008. ACM.

Mohan et al., Nericell: rich monitoring of road and traffic conditions using mobile smartphones. In *SenSys '08: Proceedings of the 6th ACM conference on Embedded network sensor systems*, pp. 323-336, New York, NY, USA, 2008. ACM.

Paek et al., Energy-efficient rate-adaptive gps-based positioning for smartphones. In *Proceedings of ACM MobiSys '10*, San Francisco, California, 2010. USA.

Rahmati et al., Context-for-wireless: context-sensitive energy-efficient wireless data transfer. In *MobiSys '07: Proceedings of the 5th international conference on Mobile systems, applications and services*, pp. 165-178, New York, NY, USA, 2007. ACM.

Ravi et al., Activity recognition from accelerometer data. *American Association for Artificial Intelligence*, 1-6 (2005).

Shih et al., Wake on wireless: an event driven energy saving strategy for battery operated devices. In *MobiCom '02: Proceedings of the 8th annual international conference on Mobile computing and networking*, pp. 160-171, New York, NY, USA, 2002. ACM.

Sorber et al., Turducken: hierarchical power management for mobile devices. In *MobiSys '05: Proceedings of the 3rd international conference on Mobile systems, applications, and services*, pp. 261-274, New York, NY, USA, 2005. ACM.

Viredaz et al., Energy management on handheld devices. *Queue*, 1(7):44-52, 2003.

Wang et al., A framework of energy efficient mobile sensing for automatic user state recognition. In *MobiSys '09: Proceedings of the 7th international conference on Mobile systems, applications, and services*, pp. 179-192, New York, NY, USA, 2009. ACM.

Yoon et al., Surface street traffic estimation. In *MobiSys '07: Proceedings of the 5th international conference on Mobile systems, applications and services*, pp. 220-232, New York, NY, USA, 2007. ACM.

Android market. http://www.android.com/market.
Facebook. http://www.facebook.com/.
Foursquare. http://www.foursquare.com/.
Myspace. http://www,myspace.com/.

Open handset alliance. http://www.openhandsetalliance.com/.
Opentable. http://www.opentable.com/.
Real Time Traffic. http://monthorin.net/tiki-index.php.
Skyhook. http://www.skyhookwireless.com/.

Twidroid. http://www.twidroid.com/.
Twitter. http://wvvw.twitter.com/.

* cited by examiner

LBA Requesting GPS-Based Location

LBA Requesting Net-Based Location

*(a) Sensing Substitution (SS)*
*Variables*
    *provider*: Requested location provider
    $Set_{Area}$: Profiled M-Areas
    $Area_{prev}$: Previous M-Area
    $Area_{cur}$: Current M-Area

```
1   Obtain most recently sensed location
2   Determine Area_cur based on Set_Area
3   If provider == Gps
4       If Area_cur's Net can satisfy LBA
5           Unregister the corresponding Gps
6           Register a new Net
7   Else // provider == Net
8       If Gps is not available AND Net is available
9           Unregister the corresponding Net
10          Register a new Gps
11      End
12  End
```

FIG. 4C (b) *Sensing suppRession (SR)*

*Variables*

$State_{cur}$: Current motion state (static or moving)
    $State_{prev}$: Current motion state (static or moving)
    $State_{micro}$: Micro transient motion state
    $State_{macro}$: Macro transient motion state
    $State_{Gps,Reg}$: Currently requested Gps state 1. Obtain motion sensor readings
2. Determine $State_{micro}$ and $State_{macro}$
3. If $State_{micro}$ and $State_{macro}$ == static
4.     $State_{cur}$ = static
5. Else
6.     $State_{cur}$ = moving
7. End
8. If $State_{prev}$ and $State_{cur}$ == static
9.     Unregister the corresponding Gps
10. Else
11.     Register a new Gps based on $State_{Gps,Reg}$
12. End
13. $State_{prev}$ = $State_{cur}$

FIG. 5B

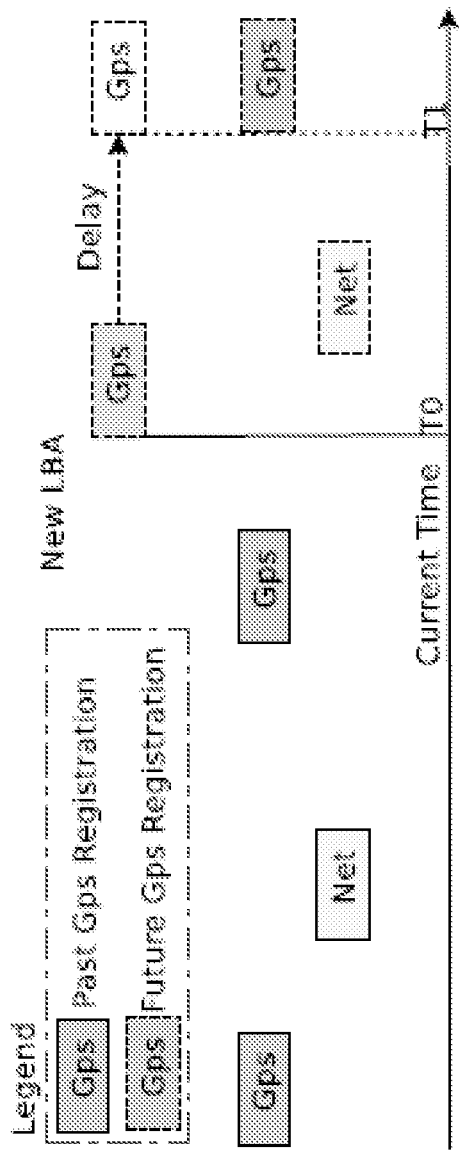
FIG. 6B: Sensing Piggybacking

*(c) Sensing Piggybacking (SP)*
*Variables*
    $State_{Gps}$: Gps registration state
    $State_{Net}$: Net registration state
    *time*: Requested location sensing frequency
    *dist*: Requested location sensing distance 1. Received requestLocationUpdate(provider, time, dist,...)
2. Store information about provider, time, distance
3. Check validity of $State_{Gps}$ and $State_{Net}$
4. If provider == Gps
5.     Compare $State_{Gps}$ to *time* and *dist*
6.     If $State_{Gps}$ allows piggybacking
7.         Delays the registration to enable piggybacking
8.     End
9. Else // provider == Net
10.     Compare $State_{Net}$ to *time* and *dist*
11.     If $State_{Net}$ allows piggybacking
12.         Delays the registration to enable piggybacking
13.     Else
14.         Compare $State_{Gps}$ to *time* and *dist*
15.         If $State_{Gps}$ allows piggybacking
16.             Delays the registration to enable piggybacking
17.     End
18.     End
19. End FIG. 6C: Sensing Piggybacking (d) *Sensing Adaptation (SA)*
*Variables*
$Bat_{cur}$: Current battery level
$Bat_{thr}$: Battery level threshold to trigger SA
$f_{time}$: Function to adjust time parameter
$f_{dist}$: Function to adjust distance parameter
1   If provider == Gps AND $Bat_{cur} < Bat_{thr}$
2      $time = time * f_{time}$
3      $dist = dist * f_{dist}$
4      Obtain user preference
5      If SA is allowed
6         Unregister the current Gps
7         Register a new Gps with *time* and *dist*
8      End
9   End

FIG. 7B

(a) GPS sensing events (b) GPS invocation times (c) GPS sleeping time (a)

(b)

(a)

(b)

(c)

(a)

(b)

(c)

(a)

(b)

(c)

(a)

(b)

(a) Before merging          (b) After merging

APPARATUS, METHOD, AND SYSTEM FOR SENSING SUPPRESSION FOR LOCATION-BASED APPLICATIONS

FIELD

The present invention relates generally to computer networks, and in particular but not exclusively, to an apparatus, method, and system for managing location-based sensing for location-based applications.

BACKGROUND

As mobile Internet becomes pervasive, Location-Based Applications (LBAs) are rapidly adopted by mobile users for always-on contact with friends, business, entertainment, and others. Examples of such LBAs include mobile social-network applications (e.g., Twitter, Facebook), local restaurant, and real-time traffic applications. Furthermore, as open smartphones such as Android phones become available, the more number of location-based applications are being developed.

However, even though smartphones become powerful enough to support various LBAs (e.g., being equipped with new sensors such as Global Positioning System or GPS), they still suffer from limited battery life, hindering the active usage of LBAs. Typical battery capacity of a smartphone today is barely above 1000 mAh (e.g., the lithium-ion battery of HTC Dream smartphone has the capacity of 1150 mAh). Unfortunately, the use of GPS, which is the core of LBAs, is power-intensive, and can cause the complete drain of the battery within a few hours.

SUMMARY

In some embodiments of the present invention, a method is provided for managing a location sensing operation for location-based applications. The method includes activating a first sensor disposed in the portable device so as to provide a location sensing operation requested by at least one location-based application. The method further includes periodically monitoring movement of the portable device by a second sensor disposed in the portable device, and suppressing the location sensing operation of the first sensor in accordance with movement of the portable device detected by the second sensor.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings, in which:

FIG. 4C shows computer codes according to another embodiment of the sensing substitution method that may be employed by the mobile device of FIG. 2;

FIG. 5B illustrates computer codes according to another embodiment of the sensing suppression method that may be employed by the mobile device of FIG. 2;

FIG. 6B illustrates flow charts of another embodiment of the sensing piggybacking method that may be employed by the mobile device of FIG. 2;

FIG. 6C shows computer codes according to another embodiment of the sensing piggybacking method that may be employed by the mobile device of FIG. 2;

FIG. 7B illustrates computer codes according to another embodiment of the sensing adaptation method that may be employed by the mobile device of FIG. 2;

DETAILED DESCRIPTION

Figure 1:
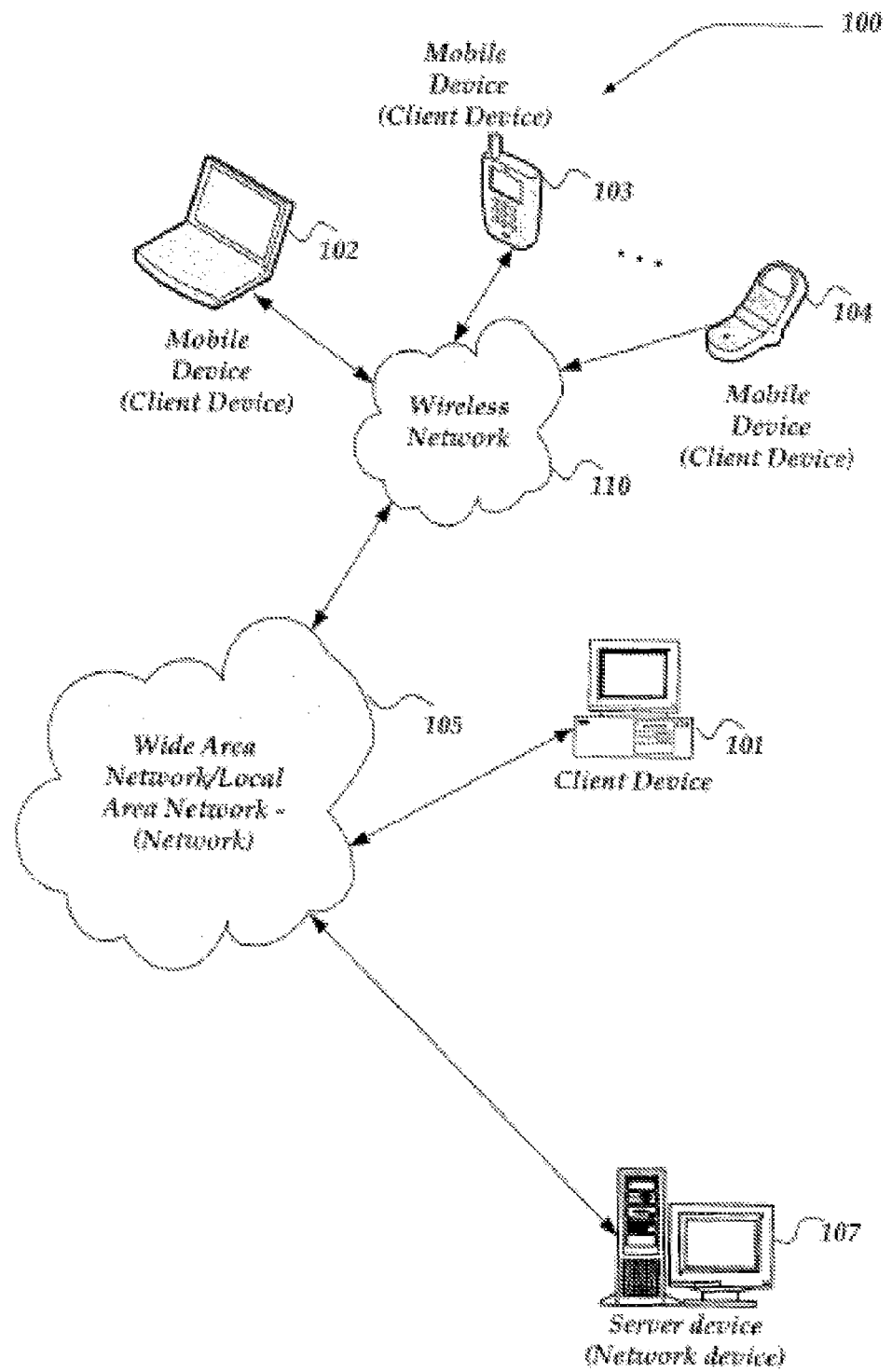
FIG. 1 shows a block diagram of an embodiment of a system for communicating over a network.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. In addition, throughout the specification, the meaning of "a," "an," and "the" include plural references. The meaning of "in" includes "in" and "on."

According to some exemplary embodiments described herein, a method is provided for managing a location sensing operation for location-based applications. The method includes activating a first sensor disposed in the portable device so as to provide a location sensing operation requested by at least one location-based application. The method further includes periodically monitoring movements of the portable device by utilizing a second sensor disposed in the portable device, and suppressing the location sensing operation of the first sensor in accordance with at least the movements of the portable device detected by the second sensor.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes network 105, wireless network 110, Trust Search Server (TSS) 106, mobile devices (client devices) 102-104, client device 101, and server device (network device) 107.

One embodiment of a client device usable as one of client devices 101-104 is described in more detail below in conjunction with FIG. 2. Generally, however, client devices 102-104 may include virtually any mobile computing device capable of receiving and sending a message over a network, such as wireless network 110, or the like. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. Client device 101 may include virtually any computing device that typically connects using a wired communications medium such as personal computers, multiprocessor systems, microprocessor-based or programmable consumer electronics, network PCs, or the like. In one embodiment, one or more of client devices 101-104 may also be configured to operate over a wired and/or a wireless network.

Client devices 101-104 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Client devices 101-104 also may include at least one other client application that is configured to receive content from another computing device. The client application may include a capability to provide and receive textual content, multimedia information, or the like. The client application may further provide information that identifies itself, including a type, capability, name, or the like. In one embodiment, client devices 101-104 may uniquely identify themselves through any of a variety of mechanisms, including a phone number, Mobile Identification Number (MIN), an electronic serial number (ESN), mobile device identifier, network address, or other identifier. The identifier may be provided in a message, or the like, sent to another computing device.

Client devices 101-104 may also be configured to communicate a message, such as through email, SMS, MMS, IM, IRC, mIRC, Jabber, or the like, between another computing device. However, the present invention is not limited to these message protocols, and virtually any other message protocol may be employed.

Client devices 101-104 may further be configured to include a client application that enables the user to log into a user account that may be managed by another computing device, such as server devices 107, or the like. In one embodiment, a credential, login username/password, or other information is employed to enable the user access to content at one or more of server devices 107-109, or the like. Such user account, for example, may be configured to enable the user to receive emails, send/receive IM messages, SMS messages, access selected web pages, and/or participate in any of a variety of other social networking activities. However, managing of messages or otherwise participating in other social activities may also be performed without logging into a user account.

In one embodiment, the user of client devices 101-104 may be enabled to access a web page, perform a query search for various content, and/or other perform any of a variety of other activities. For example, client devices 101-104 may enable a user to participate in various social networking sites, such as Twitter, LinkedIn, Facebook, and the like. In some embodiments, the users of client devices 101-104 may use locations-based applications (LBAs), which, as part of their functions, use GPS, triangulation, or other means to determine the current location of the client device.

Wireless network 110 is configured to couple client devices 102-104 with network 105. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G) generation radio access for cellular systems, WLAN, Wireless Router (WR) mesh, or the like. Access technologies such as 2G, 2.5G, 3G, 4G, and future access networks may enable wide area coverage for client devices, such as client devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between client devices 102-104 and another computing device, network, or the like.

Network 105 is configured to couple server device 107 and client device 101 with other computing devices, including through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Server device 107 may include virtually any network device that is configured to provide content and/or services over a network to another computing device. Server device 107 may further host a variety of social networking sites, including, but not limited to Flicker, Twitter, Facebook, LinkedIn, personal user sites, such as blogs, vlogs, online dating sites, and so forth. Server device 107 may also host a variety of non-social networking sites, including, but not limited, to various business sites, educational sites, dictionary sites, encyclopedia type sites, financial sites, government sites, and the like.

Server device 107 may further provide a variety of services that include, but are not limited to web services, third-party services, audio services, video services, email services, IM services, SMS services, VOIP services, calendaring services, photo services, or the like. Content may include web content, audio content, video content, FTP data, or the like.

Devices that may operate as server device 107 include personal computers desktop computers, multiprocessor systems, microprocessor-based or programmable consumer electronics, network PCs, servers, and the like.

Illustrative Mobile Client Environment

Figure 2:
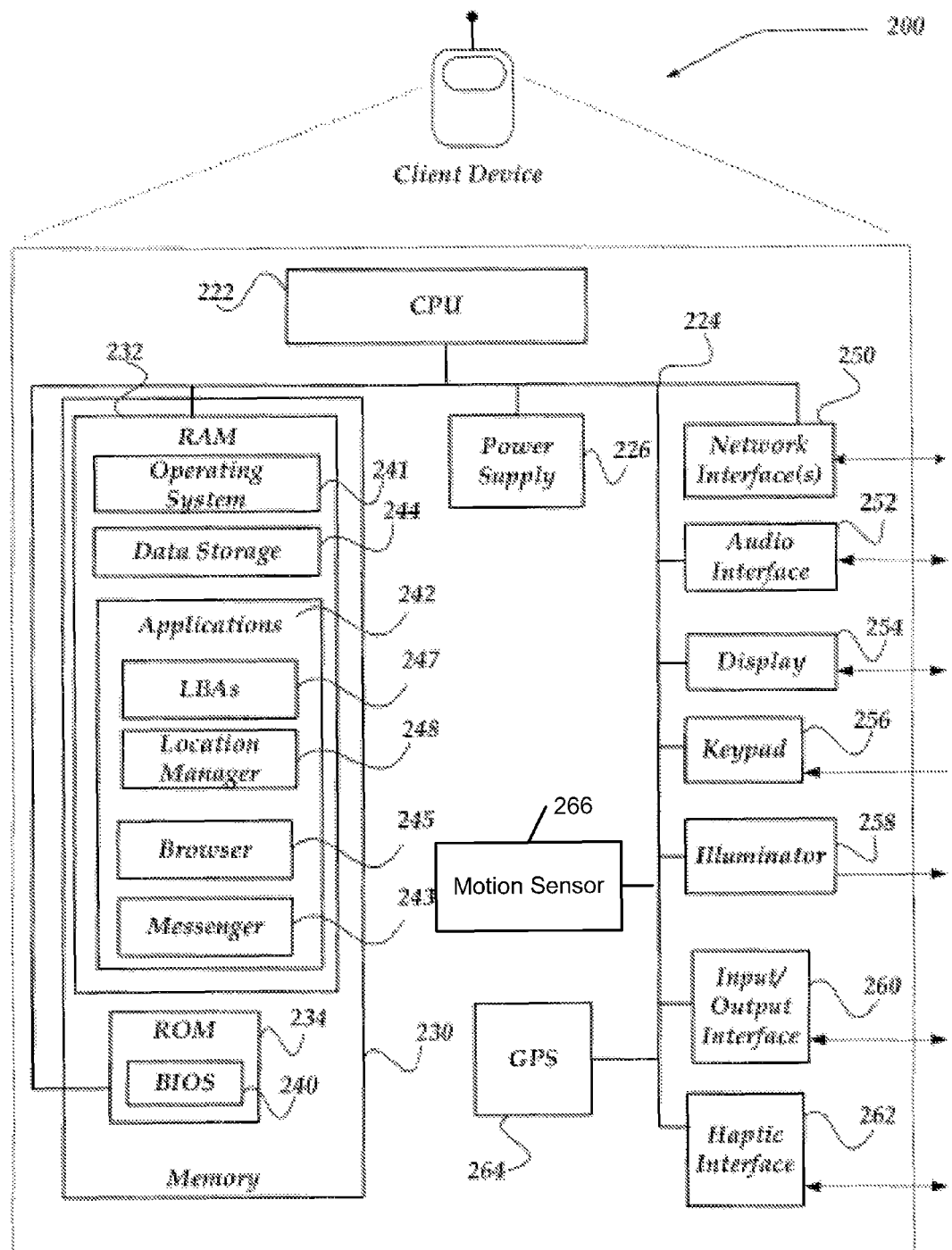
FIG. 2 illustrates a block diagram of one embodiment of a mobile device of FIG. 1.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one embodiment of at least one of client devices 101-104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264, and a motion sensor 266. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may communicate with another computing device through cellular networks, computer networks, or directly via wired/wireless connections. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. In addition, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances.

In another embodiment, rather than utilizing GPS receiver 264, client device 200 may employ network interface 250 to determine its physical location through a cellular network, a Wi-Fi network, or a Bluetooth network by way of triangulation. Alternatively, client device 200 may through other components, provide other information that may be employed to determine a physical location of the device, including for example, a MAC address, IP address, or the like.

Motion sensor 266 can determine the physical movements of client device 200 relative to the early or other references, which typically outputs mobility information of client device 200, such as speed, acceleration, orientation, direction, and the like. In one embodiment, motion sensor 266 is an accelerometer, which measures the accelerations experienced by client device 200. By monitoring sensor readings from the accelerometer, client device 200 can calculate its orientation, position, and velocity (direction and speed of movements) without the need of external references. In another embodiment, motion sensor 266 is a speedometer, which measures the traveling speed of client device 200 relative to the earth. From the speed measurement, client device 200 can determine its movement status such as moving state or static state. In general, motion sensor 266 has lower consumptions than GPS receiver 264.

Mass memory 230 includes a RAM 232, a ROM 234, and other physical storage devices. Mass memory 230 illustrates an example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by client device 200 to store, among other things, applications 242 and/or other data. For example, data storage 244 may also be employed to store information that describes various capabilities of client device 200. The information may then be provided to another device based on any of a variety of events, including being sent as part of a header during a communication, sent upon request, or the like. Moreover, data storage 244 may also be employed to store social networking information including address books, buddy lists, aliases, login username/passwords, credentials, user profiles, or the like. At least a portion of the social networking information may also be stored on a disk drive or other storage medium within client device 200.

Applications 242 may include computer executable instructions which, when executed by client device 200, transmit, receive, and/or otherwise process messages (e.g., SMS, MMS, IM, email, and/or other messages), audio, video, and enable telecommunication with another user of another client device. Other examples of application programs include calendars, search programs, email clients, IM applications, SMS applications, VOIP applications, contact managers, task managers, transcoders, database programs, word processing programs, security applications, spreadsheet programs, games, search programs, and so forth. Applications 242 may include, for example, messenger 243, browser 245, one or more location-based applications (LBAs) 247, and Location manager 248.

Browser 245 may include virtually any client application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web-based languages may also be employed. Moreover, browser 245 may be employed to request various content and/or receive such content.

Messenger 243 may be configured to initiate and manage a messaging session using any of a variety of messaging communications including, but not limited to email, Short Message Service (SMS), Instant Message (IM), Multimedia Message Service (MMS), internet relay chat (IRC), mIRC, and the like. For example, in one embodiment, messenger 243 may be configured as an IM application, such as AOL Instant Messenger, Yahoo! Messenger, .NET Messenger Server, ICQ, or the like. In one embodiment messenger 243 may be configured to include a mail user agent (MUA) such as Elm, Pine, MH, Outlook, Eudora, Mac Mail, Mozilla Thunderbird, gmail, or the like. In another embodiment, messenger 243 may be a client application that is configured to integrate and employ a variety of messaging protocols.

As previously discussed, Applications 242 include one or more location-based applications (LBAs) 247. An LBA 247 may make use of GPS, network triangulation, and/or other location sensing methods to determine the location of client device 200. There are many different reasons that an LBA 247 may be determining the location of client device 200. For example, a weather application may determine the location of client device 200 in order to know the user's location for which to indicate the weather in that location. A social networking program may determine the user's current location in order to indicate the user's current location and/or status. A restaurant application may use this location so that a determination can be made as to which restaurants are near the user. As yet another example, a navigational program may be used to help the user navigate to a desired location based on the user's current location.

Location manager 248 is employed by CPU 222 to determine which location sensing method is to be used by the location-based LBAs 247. Location manager 248 determines which location sensing method is to be used by each LBA 247, and may even use a different method than those specified by LBA 247. For example, even if an LBA 247 specifies that GPS should be used to determine location, location manager 248 determines which location sensing method is to be used and may use network triangulation to determine location rather than the specified GPS method.

In a further embodiment, location manager 248 is employed by CPU 22 to determine whether the location sensing operations should be performed or suppressed based on the movements of client device 200, when the location-based LBAs 247 request location information from GPS receiver 264. For example, When an LBA 247 is executed by CPU 222, requesting GPS receiver 264 to determine the location of client device 200, CPU 222 invokes motion sensor 264 to monitor the movements of client device 200. If the CPU 222 determines, based on sensor readings from motion sensor 264, that client device 200 is in static state (has no movements), CPU 222 suppresses the location sensing operation by GPS receiver 264, even if LBA 247 continues requesting the location information form GPS receiver 264.

Illustrative Network Device

Figure 3:
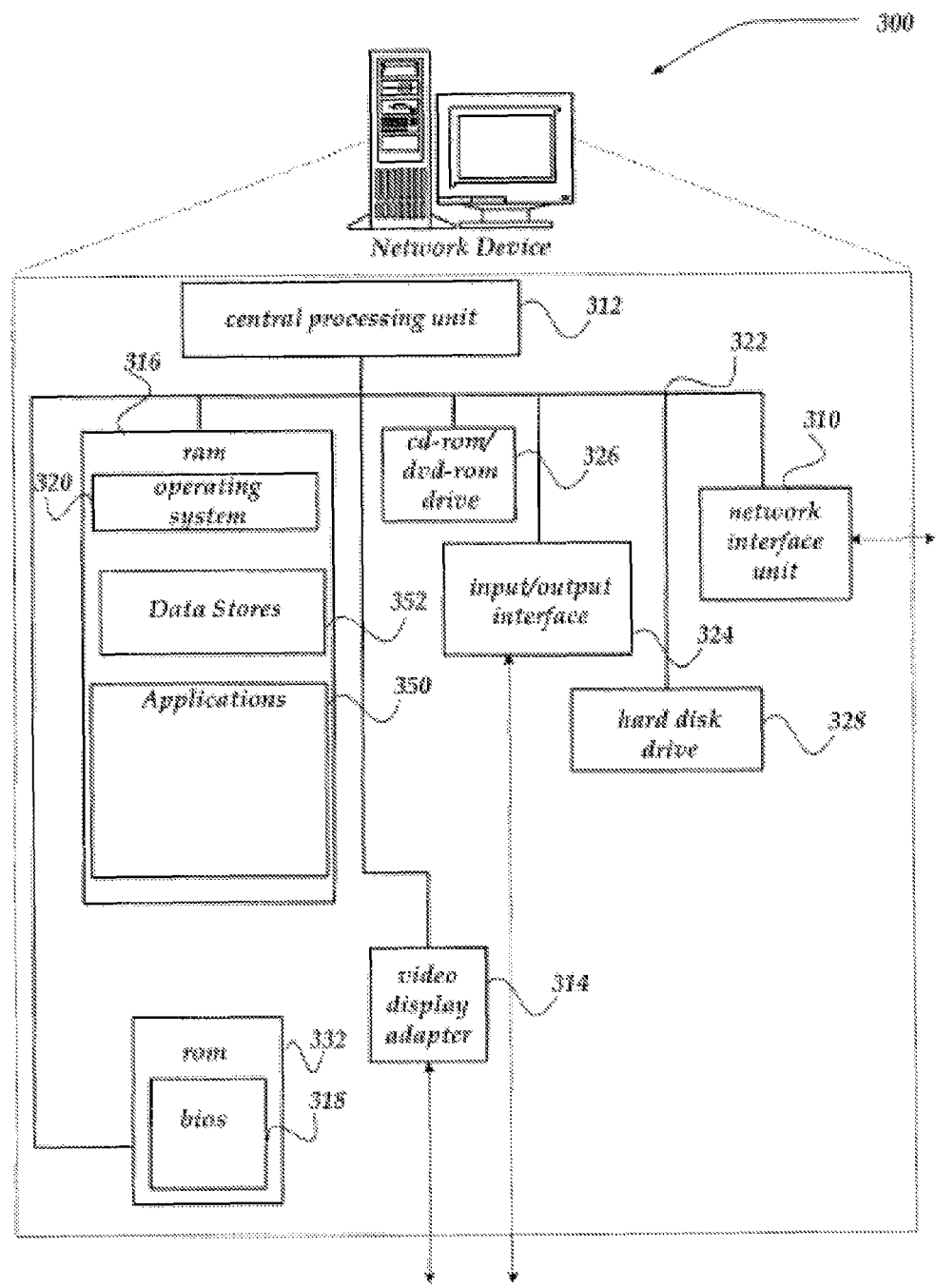
FIG. 3 shows a block diagram of one embodiment of a network device of FIG. 1.

FIG. 3 shows one embodiment of a network device, according to one embodiment of the invention. Network device 300 may include many more or less components than those shown. The components shown, however, are sufficient to disclose an illustrative embodiment for practicing the invention. Network device 300 may represent, for example, server device 107 of FIG. 1 and/or one or more of the client devices of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. As used herein, such computer-readable storage media refers to physical, tangible devices. Computer-readable storage media may include volatile, nonvolatile, removable, and non-removable media implemented in any method or technology for storage of information, such as computer readable instructions, data structures, program modules, or other data. Examples of computer-readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical devices which can be used to store the desired information and which can be accessed by a computing device.

RAM 316 may include one or more data stores, which can be utilized by network device 300 to store, among other things, applications 350 and/or other data. RAM 316 can also be used to store database information.

The mass memory also stores program code and data. One or more applications 350 are loaded into mass memory and run on operating system 320 by central processing unit 312. Examples of application programs may include transcoders, schedulers, calendars, database programs, word processing programs, HTTP programs, customizable user interface programs, IPSec applications, encryption programs, security programs, SMS message servers, IM message servers, email servers, account managers, and so forth.

Generalized Operation

Figure 8:
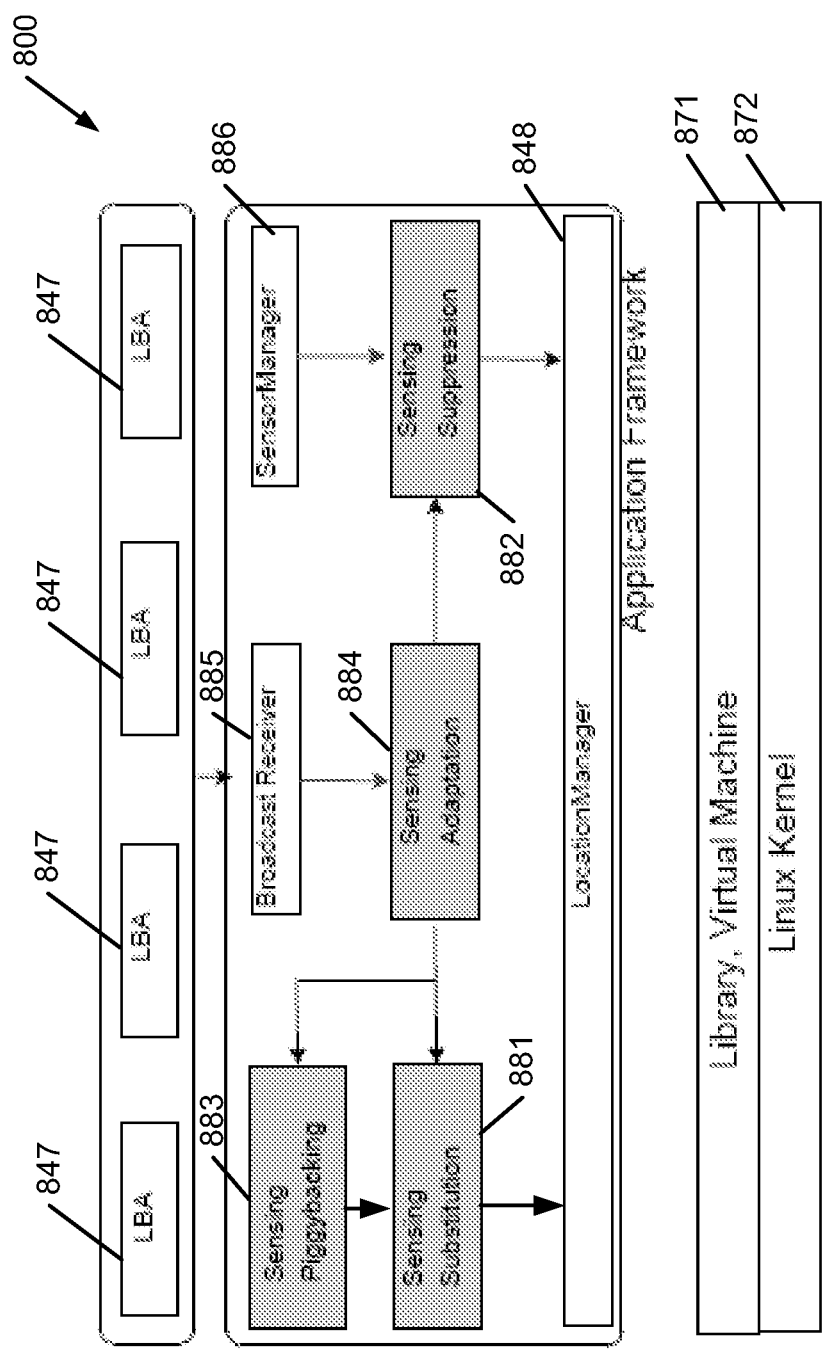
FIG. 8 shows a block diagram of an embodiment of an architecture that may be employed on an embodiment of the mobile device of FIG. 2.

FIG. 8 shows a block diagram of an architecture (800) that may be employed on an embodiment of mobile device 200 of FIG. 2. In some embodiments, mobile device 200 may be a smart phone, or the like. Architecture 800 includes LBAs 847, application framework 849, virtual machine 871, and kernel 872. Application framework 849 includes sensing substituting 881, sensing suppressing 882, sensing piggybacking 883, sensing adapting 884, broadcast receiver 885, sensor manager 886, and location manager 848. Although one embodiment of software architecture 800 is on an Android platform on a smart phone, the invention is not so limited, and other platforms may be employed.

In some embodiments, sensor manager 886 manages reading from sensors, such as an accelerometer and orientation sensors, that are monitored periodically, with information from the sensors used by sensing suppressing 882. Broadcast receiver 885 monitors the battery level of the smart phone and informs sensing adapting component 884 of the current battery level.

Components in application framework 849 operate together as an accelerator that effectively improves energy efficiency in location sensing for multiple LBAs 847 in a smart phone, or the like. In some embodiments, the accelerator includes the application four design principles: suppressing, piggybacking, substituting, and adapting. In other embodiments, only the sensing substituting principle is used. In other embodiments, the sensing substituting design principle, plus one or two or the other four principles are used together. Briefly, in some embodiments, suppressing uses other less power-intensive sensors to detect user states and suppresses unnecessary GPS sensing, when the user is in static state. In some embodiments, piggybacking synchronizes the location sensing requests of multiple LBAs 847. In some embodiments, substituting makes use of other location sensing method (e.g., network-based location sensing) that consume lower power than another location sensing method (e.g., GPS) does. In some embodiments, adapting can aggressively adjust system-wide sensing parameters such as interval and distance, depending on a battery level.

In some embodiment, one or more of the four design principles are implemented in the Android platform (e.g., v1.5) as a middleware. Even though the design principles are general enough to be applied to any layer, the middleware approach may achieve the benefit of application transparency. The middleware implementation may be employed in G1 Android Developer Phones (ADPs) and real LBAs, including real-time traffic, twitroid, and others. Depending on scenarios, some embodiments of FIG. 8 implemented in G1 Android Developer Phones and real LBAs may reduce the number of GPS invocations by up to 95%, and the battery life can be improved by up to 100%. However, the invention is not limited to Android or middleware and may be implanted in other ways in various embodiments. By implementing the design principles in middleware, in these embodiments, the implementation is application-transparent. The design principles operate under the application layer so that application designers of LBAs or other applications do not have to make any modifications to applications in order to accommodate any of the four design principles.

Off-the-shelf smartphones generally support two major types of location-sensing mechanisms—global positioning system (GPS) and network triangulation (Net). These sensing mechanisms typically have performance tradeoffs on accuracy, power-consumption, and dynamics. For instance, for the two location mechanisms supported by Android platforms, Gps is generally more accurate than Net. In terms of power-consumption, Gps consumes more power. As for dynamics, both GPS and network-provider expose certain degree of dynamics in terms of availability and accuracy. Specifically, Gps's accuracy and availability depends on a set of factors, especially exposure to satellites. Similarly, Net depends on the number of reachable access points (AP)s or cell towers and the availability of their location information.

Depending on specific environments (e.g., inside buildings) or contexts (e.g., phones being static), certain location-sensing operations may be unnecessary or impossible to perform, and blindly requesting location sensing cause power consumption. These environment and context information can be obtained by using other types of sensors such as mobility-related sensors. Today's mobile platforms are typically equipped with multiple sensors such as accelerometer, orientation sensors, magnetic sensors, light sensors, and data-connection. Many of them consume much less power than those used for location sensing. Accordingly, using these sensors to optimize location sensing can help conserve energy.

Given limited battery capacity, when the battery level is low, users typically are willing to tolerate degradation of location-accuracy in favor of longer operation time.

Mobile platforms are increasingly running multiple LBAs 847 with multiple location-sensing requests. Some embodiments of the invention take advantage of the multiple location sensing methods available on smartphones. Further, some embodiments of the invention use heterogeneous performance and power-consumption tradeoff from multiple sensing mechanisms and other sensors (e.g., accelerometer) to reduce sensing invocations. Further, some embodiments of the invention can converser battery power by adapting the parameters of location-sensing mechanisms.

Sensing Substituting Operation

Figure 4A:
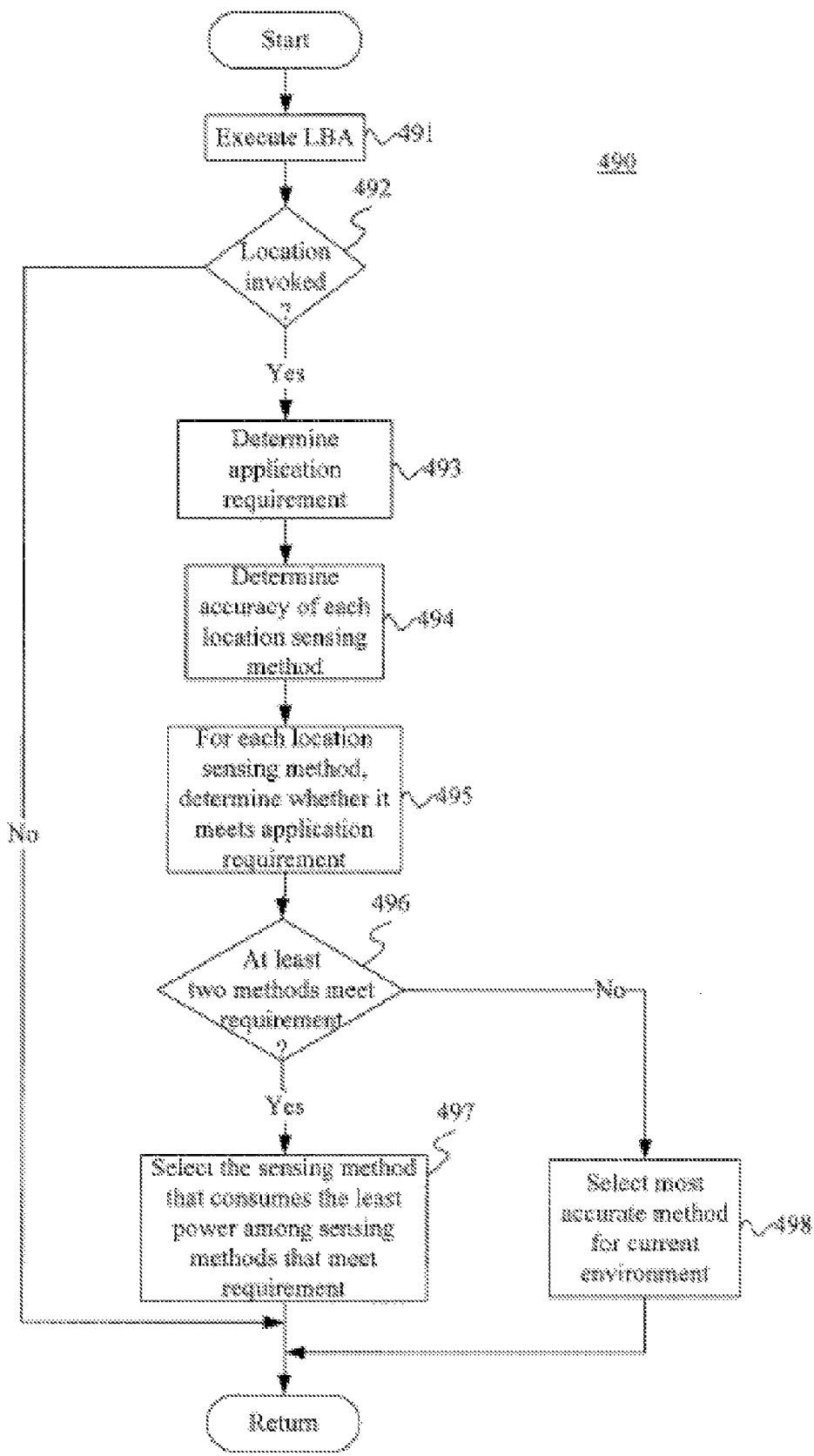
FIG. 4A illustrates a flow chart of an embodiment of a sensing substitution method that may be employed by an embodiment of the mobile device of FIG. 2.

FIG. 4A shows a flow chart of an embodiment of a method (490) that may be employed by an embodiment of client device 200 of FIG. 2. After a start block, the process proceeds to block 491, where an LBA is executed. The process then moves to block 492, where a determination is made as to whether a location is evoked by the location-based application. There are at least two location sensing methods that may be used by the LBA, and further steps of method 490 are used to determine which location sensing method to use to invoke the location.

If the determination at decision block 492 is negative, the process moves to a return block, where other processing is resumed. If however, the process at decision block 492 is positive, the process then moves to block 493; where the application requirement for location accuracy requirement by the location-based application is determined. The process then advances to block 494, where, for each location sensing method, the location accuracy for the current environment is determined. The process then proceeds to block 495, where, for each location sensing method, a determination is made as to whether the location-based sensing method meets the application requirement. Of course, any location-based sensing method that does not function in the current environment does not meet the application requirement.

The process then moves to decision block 496, where a determination is made as to whether at least two location sensing methods meet the requirement. If so, the process advances to block 497, where the location sensing method that consumes the least power among the location sensing methods that meet the application requirement is selected as the location sensing method to invoke the location. The process then proceeds to the return block, where other processing is resumed.

If, however, the determination at decision block 496 is negative, the process moves to block 498, where the most accurate location sensing method for the current environment is selected. Of course, a location sensing method that does not work at all in the current environment is not considered accurate. The process then proceeds to the return block.

Though various location providers such as Gps and Net exist, they have a variety of performance tradeoffs including energy consumption and accuracy. Android software development kit (SDK) classifies the mechanisms into fine-grained (e.g. Gps) and coarse-grained (e.g. Net), with the assumption that Gps always provides more accurate location information than Net. This assumption is not always true, but depends on the particular environment. For example, in certain indoor environments and dense urban areas, Gps may be unable to sense any location information, not to mention providing accurate location. Similarly, the performance of Net is heavily affected by the environment. In dense urban areas, for instance, wireless fidelity (WiFi)-triangulation can achieve as much as accuracy. But in rural areas where there are very few or even no APs, the WiFi-triangulation simply stops working. The same is true for cell-tower triangulation. A general example of sensing substitution is illustrated above in FIG. 4A. In one embodiment, the first location sensing method of FIG. 4A is GPS and the second location sensing method is Net.

Sensing Substituting 881 can choose the most appropriate location-sensing mechanism on the fly, without incurring more power consumption than the default requests. Specifically, in some embodiments, Sensing Substituting 881 is context-aware and learns the characteristics of the multiple location providers along the routes where phones move. Sensing Substituting 881 then performs location sensing in a more energy efficient manner by substituting another provider for the requested one. Since typical users follow fixed mobility pattern in terms of locations they visit routinely, such as going to office and back home, and each of the location mostly has stable environmental characteristics such as GPS signal strength and number of APs, utilizing the environmental information can help select the most appropriate location provider.

Sensing Substituting 881 relies on the learned environmental characteristics such as the availability and accuracy of the location providers. These characteristics are obtained by a Provider Profiler. The profiler monitors and stores relevant information, including current locations, number of visits to these locations, and the sensing characteristics of Gps and Net. The profiler maintains a database of the profiled mobility pattern. The data consists of a list of entries, and each entry corresponds to a profiled area. The areas can be represented in different forms. For example, it can be a physical area with certain geographical boundaries. It can also be more logically describable like a coffee shop. In general, the locations in the same area are given similar sensing characteristics. The number of visits indicates the popularity of the area with respect to the particular user. In a further embodiment, the profiler monitors and stores relevant information, including current locations, visit frequency, and sensing characteristics (e.g., availability, positioning accuracy) of location providers. The profiled data consists of a list of entries, and each entry corresponds to a profiled area which is referred to as an M-Area. M-Areas represent physical areas with geographical boundaries and have similar location-sensing characteristics.

Figure 4B:
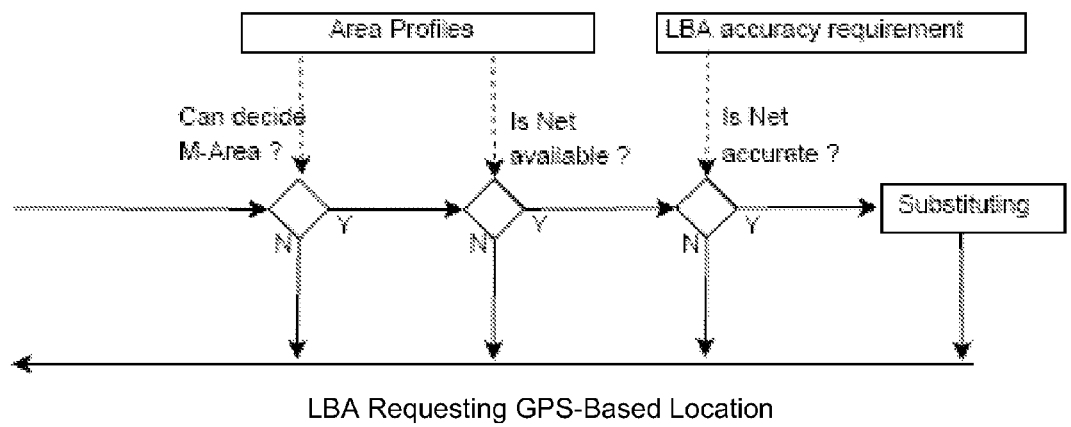
FIG. 4B illustrates flow charts of another embodiment of the sensing substitution method that may be employed by the mobile device of FIG. 2.
Figure 4B:
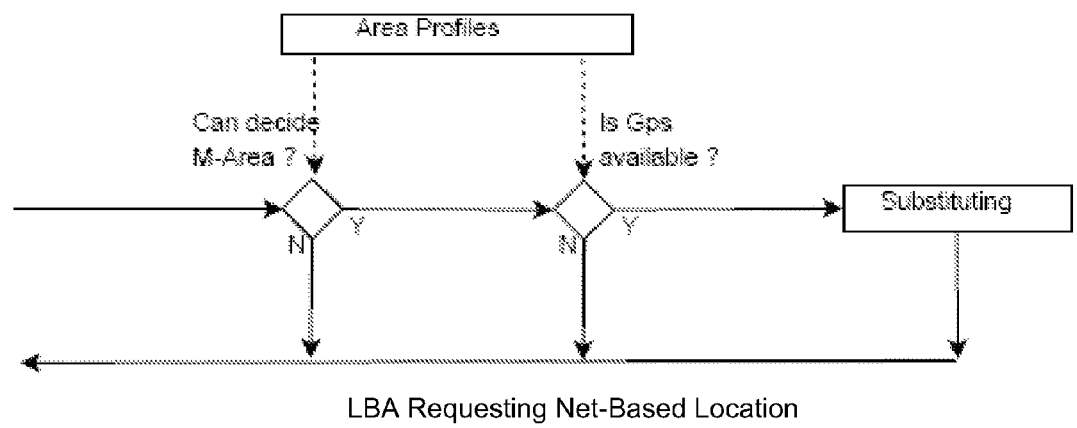

Based on the profiled areas, Sensing Substituting 881 dynamically decides an optimal location-sensing mechanism as follows. FIG. 4B illustrates an exemplary embodiment utilizing the Android platform for providing sensing substituting operations. Specifically, when the current registered location-sensing mechanism is GPS, if the user moves into an area where Net (i.e., network-based mechanism) is available and its accuracy can fulfill the LBA's requirement, LBA 847 uses Net to replace GPS. Accordingly, Sensing Substituting 881 first attempts to decide the most appropriate M-Area. Then, it checks Net's availability and accuracy. If Net's accuracy can satisfy the requirement of the LBA, Sensing Substituting 881 performs substitution. Similarly, when the current location-sensing mechanism is Net and client device 200 moves into areas where Net is not working, Sensing Substituting 881 invokes GPS, instead of Net. Since GPS consumes more power, Sensing Substituting 881 uses less frequent GPS sensing to maintain the same level of energy consumption.

In some embodiment, the profiler is designed to be automatic. However, in other embodiments, to ensure higher degree of accuracy, it can also involve the users by allowing users to explicitly control the profiling process. For example, users may help specify the area boundary. In some embodiments, the profiler can be designed to calibrate periodically or depending on the changes in the profile characteristics. Specifically, whenever there is a need to do profiling, the process will be invoked. For instance, when the user moves to a new city for a new job, the profiler should be able to detect that and aggressively initialize the profiling process to accommodate the environment change. In particular, when the profiler is first initialized, it will do the profiling. After that, the profiling process keeps monitoring the necessity of performing profiling again. The necessity is measured by an opportunistic verification process. Specifically, profiling is periodically invoked to measure the positioning characteristics and compare the positioning characteristics to the information stored in the profiler database. If the comparison results in a large discrepancy value, then another profiling is needed. In some embodiments, the periodical verification is piggybacked on the existing Gps/Net requests, so that the verification does not incur additional energy cost in terms of invoking more sensing requests.

With the profiled information, the dynamic selection process can decide the optimal selection of location providers. Specifically, first, when the user moves into an area where Gps is not available, location manager 848 shuts down GPS sensing and uses other location sensing mechanism (e.g., Net). Second, when a user moves into an area where the Net's accuracy is comparable to or even better than Gps, location manager 848 uses Net instead (as previously discussed, Net consumes less power than Gps). Third, when in areas where Net is not possible, location manager 848 invokes Gps for replacement. In some embodiments, since gps consumes more power than Net, the process use less frequent GPS sensing to maintain the same level of energy consumption.

Sensing Suppressing Operation

Figure 5A:
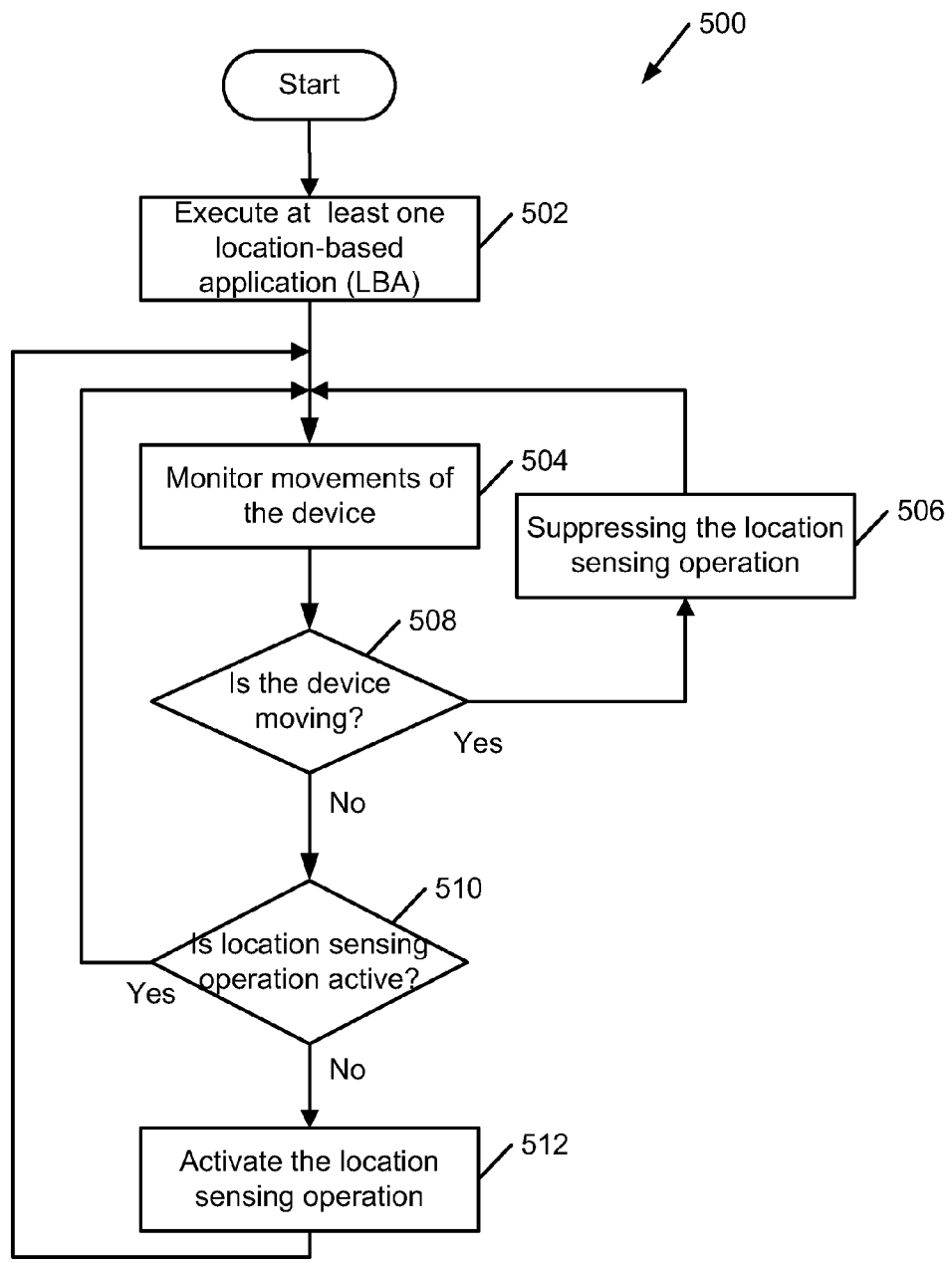
FIG. 5A illustrates a flow chart of an embodiment of the sensing suppression method that may be employed by the mobile device of FIG. 2.

FIG. 5A shows a flow chart of an embodiment of a method (500) that may be employed by an embodiment of client device 200 of FIG. 2. As shown in FIG. 8, method 500 can be provided by Sensing Suppression Module 882. Specifically, after a start block, the process proceeds to block 502, where at least one LBA is executed. The LBA requests location sensing operations from location sensing device such as GPS receiver 264. The process then moves to block 504, where the motion sensor 266 is invoked to monitor movements of client device 200. In block 508, the process determines if client device 200 is in moving state or static state. If client device 200 is moving, the process proceeds to block 506 to suppress the location sensing operation by, GPS receiver 264 and then return to block 504. If process determines client device 200 is not moving (i.e., static state), the process then proceeds to block 510, where the process determines if the location sensing operation is activated. If the location sensing operations is activated, the process returns to block 504. If it is determined in block 510 the location sensing operation is suppressed, the process proceeds to block 512 to activate/reactivate the location sensing operation and then return to block 510. Process 500 is performed iteratively until the LBA is terminated.

The bases for sensing suppressing design principle are: (i) there are scenarios where continuous location-sensing is not needed. For example, location-sensing is unnecessary when the phone is placed on a table at home; and (ii) many sensors (e.g., accelerometer, orientation sensors, magnetic sensors, light sensors) consume different levels of powers. If such mobility-related contexts are known, future location-sensing requests can be potentially suppressed to save energy. The basic mobility-related context is whether the phone is static or moving, but it can contain more sophisticated information such as moving speed and direction. Such sophisticated information can be used to predict the phone's future locations rather than actually sensing them.

An aspect of this design principle is learning the mobility-related context (e.g., being static or moving) with energy-efficient sensors. Embodiments of the invention use low-power sensors including accelerometer and orientation sensors to profile users' location context, as opposed to the camera and microphone, which typically consume much more power than the low-power sensors, and are therefore not used by Sensing Suppressing 882.

It is preferable to ensure the correctness of mobility-context extraction. False positives of the extraction (i.e., falsely detect that the phone is moving while it is not) will lead to the unnecessary location sensing, while false negatives will cause more serious results for the changing locations cannot be sensed. Various approaches are employed in some embodiments to reduce these errors, particularly the false negatives.

First, in some embodiments, the framework exposes a configuration option to the user, allowing the user to manually enable/disable the suppressing option.

Second, in some embodiments, the aggressiveness of suppressing can be automatically adjusted based on other information such as the confidence levels of the learned mobility context. The confidence levels can be determined by information such as familiarity of the current locations and routes. For example, if a location or route is part of the user's daily routine (e.g., a commuting route), the suppression confidence level is increased. From the routine route, the mobile device can learn the user's path. Based on its current speed of the users, the mobile device can estimate or predict the current location without triggering additional location sensing.

Third, in some embodiment, suppressing can be adjusted based on the application requirements. For example, if the application requires very coarse location information, the suppressing can choose to work. Otherwise, it may choose to be disabled.

Fourth, in some embodiments, certain verification mechanisms can be used to verify the correctness of the predication. For example, location sensing can be invoked periodically for verification purposes even when in suppressing mode. For the applications that require coarse location information, the suppression can be triggered more often. However, to avoid potential error, some embodiments provide a verification method. While determining the suppression frequency, the mobile device can assume a suppression predication (e.g., there is no need to trigger a location sensing within the next five minute). To verify this predication, the mobile device employs a periodic timer to trigger additional location sensing (e.g., every two or three minute) to verify whether the original predication is still correct or not. This helps to reduce potential error caused by the sensing suppression.

Sensing Piggybacking Operation

Figure 6A:
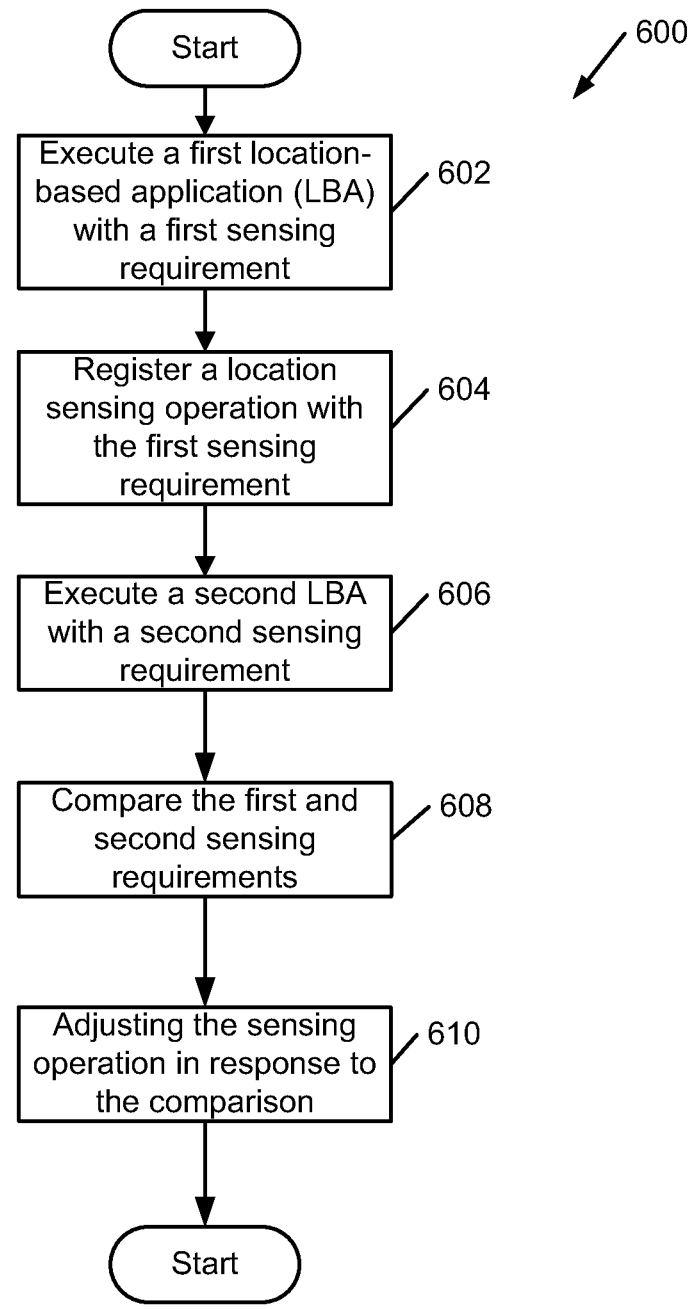
FIG. 6A illustrates a flow chart of an embodiment of a sensing piggybacking method that may be employed by an embodiment of the mobile device of FIG. 2.

FIG. 6A shows a flow chart of an embodiment of a method (600) that may be employed by an embodiment of client device 200 of FIG. 2. In another embodiment, method 600 can be provided by Sensing Piggybacking Module 883. Specifically, after a start block, the process proceeds to block 602, where a first LBA is executed. The first LBA requests location sensing operations with a first sensing requirement from location sensing device such as GPS receiver 264. The process then moves to block 604, a location sensing operation is registered to provide locating sensing with the first sensing requirement. In block 606, the process executes a second location-based application with a second sensing requirement. In blocks 608 and 610, respectively, the process proceeds to compare the first and second sensing requirements and adjusting the location sensing operations in response to the comparison performed in block 608.

According to one embodiment, Sensing Piggybacking Module 883 in FIG. 8 is configured to re-use the existing sensing registration by piggybacking new sensing requests on existing ones, thus eliminating some location sensing and conserving energy. For example, in FIG. 8, assuming there is a LBA 847 requesting location sensing every 2 minutes when the second LBA 847 starts, if the new LBA 847 requests sensing with the same time interval, it can simply piggyback on the existing registered requests, thus eliminating the overhead of performing separate sensing. Reducing the number of separate sensing can help save the energy associated with sensing as the sensing hardware can go to sleep between sensing.

Applications may request and register the sensing in various ways, as supported by the underlying framework or system. Android platform (e.g., Version 1.5), for example, allows application designers to perform two types of sensing registration. In the first type, the application may choose to statically register a location listener, and the location updates will be sent to the listener periodically according to the specified parameters including minimum time interval and minimum distance interval. This method is simple, but it relies on the underlying framework to allow GPS sleeping between two sensing operations. For example, if a Gps registration requires 30 seconds to perform the sensing, then if the specified minimum time interval is more than 30 seconds, the framework can choose to turn off the Gps and put it into sleep to conserve energy. The other type is to explicitly register/unregister the GPS sensing registrations to allow for hardware sleeping. For instance, if the preferred minimum time interval between two sensing reports is 1 minute, the application can register/unregister the request every one minute. Assuming unregistering Gps will put GPS into sleeping mode, this method does not rely on the underlying framework to support energy conservation through GPS sleeping. This treatment may have other benefits such as avoiding unnecessary sensing when the GPS report is not needed or GPS sensing is not possible. The downside of this method is the increased complexity of the application design.

In the following, the first type of registration is referred to as One-time Registration, while the second type of registration is referred to as Multi-time Registration, which each makes use of the underlying GPS in different fashions. For One-time Registration, depending on the mobile systems, optimizations might be applied to save energy. Whether and how to apply the techniques depends on the GPS location management of multiple registrations. Specifically, when there are multiple sensing registrations, the underlying location manager needs to accommodate multiple registrations with different sensing requirements. For example, if there are two registrations, one of them requires gps sensing every 2 minutes, and the other requires every 1 minute, location management 848 may choose to combine these two registrations by simply considering the finest one, i.e., every 1 minute.

When a registration is instantiated, the location sensing is immediately attempted to get the sensing values. Such behavior can be wasteful if another location sensing request of the same type will occur within a short period of time. The result is two separate location sensing operations. For Multi-time Registration, in some embodiments, it is preferable to piggyback the otherwise wasteful sensing on other sensing operations. Specifically, one embodiment piggybacks location sensing with respect to the following two scenarios. These two scenarios concern the joining of new applications. The location sensing requirements are described herein as ($G_1$, $T_1$, D1), where $G_1$ is the granularity of sensing, $T_1$ being the minimum sensing time interval and $D_1$ being the minimum distance interval. Where other applications are running when an application joins, ($G_f$, $T_2$, $D_2$) denotes the finest fine-grained location sensing registration, and ($G_c$, $T_3$, $D_3$) denotes the finest coarse-grained registration.

The joining LBA has fine-grained request: When a fine-grained registration with ($T_1$, $D_1$) comes, the current registered requests are checked. (i) If there are fine-grained requests registered so far with ($T_2$, $D_2$), this value pair is compared to ($T_1$, $D_1$). If ($T_1$, $D_1$)>($T_2$, $D_2$), it waits for the firing of next sensing (i.e., delays sensing operations for the joining LBA). On average, it waits for $T_2/2$ time. (ii) if only coarse-grained is registered, then it immediately moves on to register fine-grained request. FIG. 6B illustrates one piggybacking scenario where both Gps and Net registrations have been maintained. The joining LBA requests Gps, and the new registration is delayed to piggyback on existing Gps registrations.

The joining LBA has coarse-grained request: When a fine-grained registration with ($T_1$, $D_1$) comes, the current registered requests are checked. (i) If there are coarse-grained requests registered so far with (T3, D3), this value pair is compared to ($T_1$, $D_1$). If ($T_1$, $D_1$)>($T_3$, $D_3$), it waits for the firing of next sensing. On average, it waits for $T_3/2$ time. (ii) if only fine-grained is registered, then it compares to ($T_2$, $D_2$) to see whether the current registration satisfies its requirement. If so, it uses the current one; otherwise, registers a coarse-grained request.

Sensing Adapting Operation

Figure 7A:
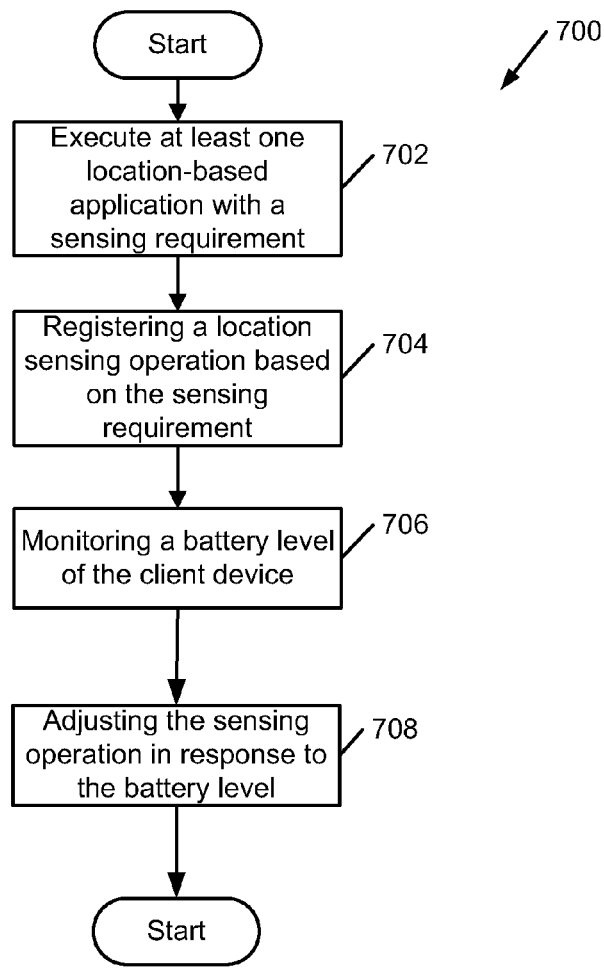
FIG. 7A illustrates a flow chart of an embodiment of the sensing adaptation method that may be employed by the mobile device of FIG. 2.

FIG. 7A shows a flow chart of an embodiment of a method (700) that may be employed by an embodiment of client device 200 of FIG. 2. In another embodiment, method 700 can be provided by Sensing Adaptation Module 884. Specifically, after a start block, the process proceeds to block 702, where at least one LBA is executed. The LBA requests location sensing operations with a sensing requirement from location sensing device such as GPS receiver 264. The process then moves to block 704, a location sensing operation is registered to provide locating sensing with the sensing requirement. In block 706, the process monitors a battery level of client device 200. In block 708, the process proceeds to adjust the sensing operation in response to a change in the battery level.

Sensing Adaptation Module 884 adapts the location sensing frequency based on the current battery level. The reason for doing so is the preference of longer operation time over higher accuracy. Except for running several accuracy-critical applications, users most likely are willing to trade accuracy for time for the simple reason of continuous operations. For instance, when the battery level is low, and a user is playing Twitter on his mobile phone and using the Gps for the location sensing, he might be more willing to run the application with less-accurate locations in return for longer operational time.

The adaptation can be performed on several types of operations. For instance, the GPS sensing time intervals can be changed, the minimum GPS sensing distance can be adjusted. Specifically, if there is a need to conserve energy more aggressively when battery-level is low, the sensing time intervals and distance intervals can be increased correspondingly by a function $f_{BA}$. Denoting the requested time update interval, distance update interval, and current battery level as $T_i$, $D_i$, and $L_b$, respectively, the values of $T_j$ and $D_j$ can be obtained by $(T_j, D_j) = f_{BA}(T_i, D_i, L_b)$.

However, some applications are critical about the location accuracy regardless of the battery level. Examples of such applications include certain health-care and military usage. With these applications, any adaptation based on battery-level has to respect the application requirement.

In part because of the criticality of certain applications, in some embodiments sensing adapting 584 explicitly asking the users to decide whether to perform adaptation or not. First, for the same applications, different users may assign them with different importance in terms of location accuracy. For example, given a health-care application, a healthy teenager may think that to be unimportant, while an elder patient may think it to be of critical importance. Second, even for the same application and same user, the importance of location accuracy may also vary. For instance, when a person is sick, the health-care application becomes more important. Whenever adaptation is needed, the user is notified of the forthcoming adaptation and has the opportunity to enforce it or reject it. The user can even be given finer decisions such as deciding the adaptation parameter values. Practically, the user may be greeted with a user-interface which notifies the user and asks about the preferred decision. Then the user can make his decisions based on his preference. Some embodiments may employ a more intelligent design which remembers or even predict the users' selection, thus reducing the users' overhead of making decisions.

There are different approaches to energy saving by adapting certain behaviors, each focusing on one way of saving energy. Other than the location-determination context, there are other types of approaches such as adjusting the screen light, sleep-time, or even the volume of ring tongs. In some embodiments, the following location-sensing related behaviors are adjusted: (i), the adaptation can be done by changing the sensing frequency or interval. In some embodiments, when battery level is low, the existing sensing registration will be modified to have larger sensing intervals. This can practically be done by removing registration and adding registrations. When new applications register location sensing, the sensing intervals are also increased. (ii), in some embodiments, the adaptation can be done by changing the sensing distance interval. Similar to the preceding approach, the distance intervals are modified to reflect the battery-levels. (iii), in some embodiments, the adaptation can be performed by adjusting the aggressiveness of the other three design principles. For example, the sensing-suppressing can be more aggressively used to reduce the location sensing usage. As another example, sensing substituting can be more aggressive; for example, for each LBA, the application requirement can be lowered so that, in the sensing substitution, less accuracy is required for each location sensing method to meet the application requirement.

As previously discussed, architecture 800 can be realized as middleware, residing between applications and underlying libraries and kernels. Specifically, in some embodiments, architecture 800 employs the Android platform, which has the Application Framework 849 that packages many classes and interfaces. The realization can be performed inside the Application Framework 849, by both modifying existing classes and adding new classes. As illustrated in FIG. 8, all the four design principles can be implemented inside the framework, and particularly the Battery-aware Adapting can work together with the other three design principles. As previously discussed, some embodiments of the invention do not use all four design principles, and accordingly one or more of Sensing Substitution Module 881, Sensing Suppression Module 882, Sensing Piggybacking Module 883, and Sensing Adapting Module 884 can be used in some embodiments and not used in other embodiments.

Figure 9A:
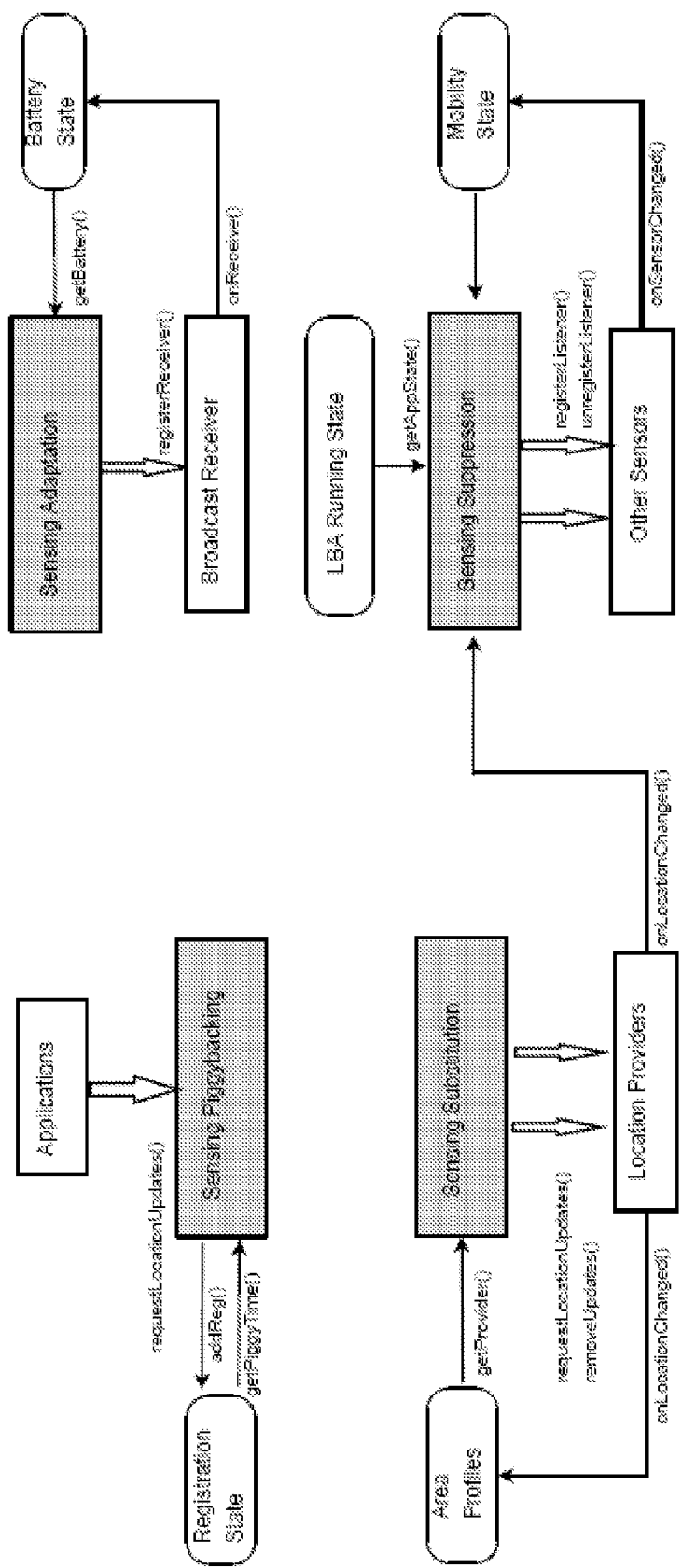
FIG. 9A illustrates operations of an integrated system according to one embodiment of the mobile device of FIG. 2.
Figure 9B:
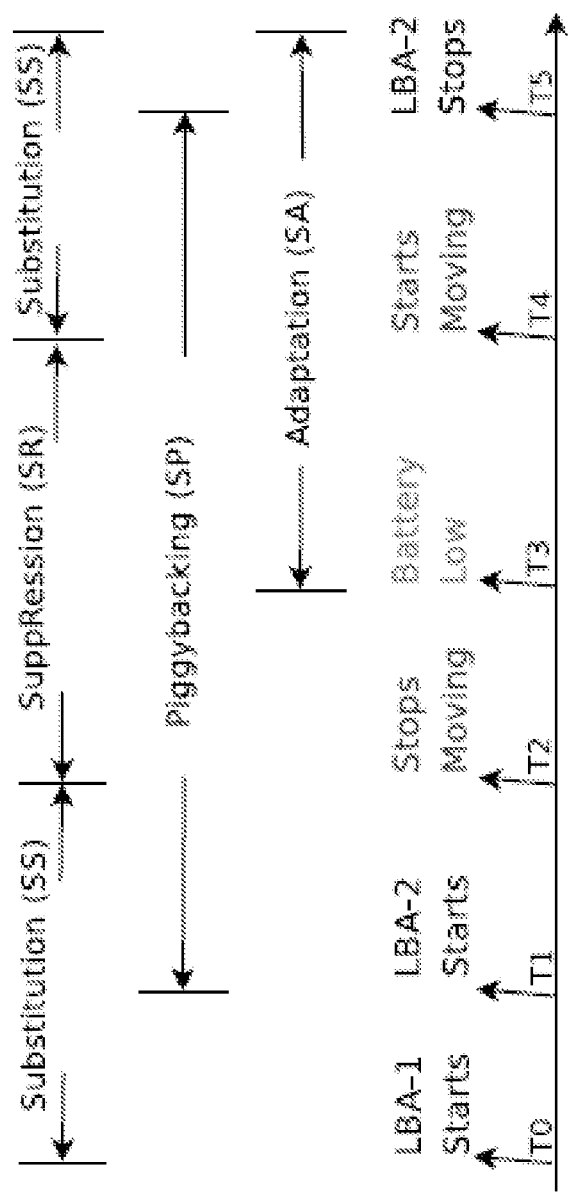
FIG. 9B illustrates a functional block diagram of a deployment model of an embodiment of the architecture of FIG. 5 on the Android platform.

FIG. 9A illustrates a functional block diagram of a deployment model of an embodiment of architecture 800 of FIG. 8 on the Android platform. In some embodiments, the deployment model on Android mobile system may be used as follows. One of more of the four design principles can be realized on top of existing classes and interfaces of the current Android Application Framework. In general, the four design principles can work together for better energy saving in various embodiments. FIG. 9B illustrates the operation of an exemplary embodiment. In this embodiment, the user is initially in motion and the battery level is high. After the user starts LBA-1 at time T0, Sensing Substitution module 881 begins to work. After the second LBA starts at T1, Sensing Piggybacking module 883 becomes operational. When the user becomes static, Sensing Suppression module 882 becomes operational. When the battery level becomes low, Sensing Adaptation module 884 comes into play. As the user starts moving again, Sensing Suppression module 882 stops, and Sensing Substitution model 881 is invoked when necessary.

The adoption of certain embodiments of the invention is through a new system image, which includes both the Application Framework and embedded applications. Users can simply re-compile or download the system image, then update the phones with a utility.

The design principles of Sensing Piggybacking and Sensing Substituting are executed sequentially in some embodiments. In some embodiments, whenever the framework detects the registration of location sensing by hooking on the noted function calls, it will perform Sensing Piggybacking and Sensing Substituting sequentially based on the respective states. Specifically, in some embodiments, Sensing Piggybacking records the location-sensing registrations into Registration State and obtains the piggybacking time by checking this state. In some embodiments, Sensing Substituting reads the Area Profile State and determines the most appropriate location provider.

The design principles of Battery-aware Adapting and Sensing Suppressing can be implemented with separate threads, and their invocations are triggered by battery level changes and timers. Specifically, in some embodiments, Battery-aware Adapting registers for battery change updates with the Broadcast Receive, and the received battery level information is kept as Battery State. In some embodiments, Sensing Suppressing periodically checks the application running states and the user's mobility state for the purpose of registering or unregistering sensors. It maintains two states: LBA Running State and Mobility State.

As previously discussed, some embodiments may be implemented on a G1 Android Developer Phone (ADP1) as a middleware approach, with some or all of the four design principles and the mobility profiling process implemented in Java inside Android Framework. In some embodiments, the architecture 800 contains GUI interfaces which allow the user to enable, disable and configure the accelerator. In some embodiments, the GUI interfaces allow the display of a configuration interface for the desired sensing adaptation degree. The interface may also show the expected battery saving time with the current adaptation degree.

The details of each module shown in FIG. 8 are further described hereinafter.

Sensing Substituting Embodiment

The design principle of sensing substituting aims to determine the most appropriate location provider on-the-fly, and dynamically use that location provider, irrespective of what the location provider the application requested. Specifically, in some embodiments, when the requested location provider is Gps, and Gps becomes unavailable, then sensing substation 881 checks the availability of Net for use. If Net is available, the component obtains the accuracy value of Net and determines whether to use it or not based on application requirement. The determination process can be controlled by the user with a pop-up dialog informing the Net accuracy and asking actions. When the requested provider is Net provider, which becomes unavailable, and Gps is used if available. In some embodiments, since Gps consumes more power, to maintain the same level of power consumption, Gps is requested with reduced location update frequency.

In order to perform dynamic selection of location providers and accommodate the mobility of the phone, sensing substituting 881 may be invoked periodically. In some embodiments, a separate thread is used to do that. FIG. 4C illustrates one embodiment, where the Handler Class in Andriod SDK is used in a prototype to implement the separate thread inside the inside the LocationManager Class. Specifically, whenever the task is invoked (lines 1-2 of FIG. 4C), sensing substituting 881 attempts to determine the most appropriate area where the phone is residing. After finding such an area from the profiled data, then sensing substituting 881 attempts to determine the available location provider based on the profiled data. If the only available provider is different from what is requested, sensing substituting 881 unregisters the current provider and registers the available one (lines 5-10 of FIG. 4C). In some other embodiments, sensing substituting 881 captures the registration of the provider, and records the registered provider, the listener, the registered time update interval and the distance interval. This information is used for new registration.

For each time of invoking, the current location's profiles of location providers are checked. The profiles are initialized by training data and are updated by monitoring the sensed characteristics of the running LBAs. The profiles are extracted into areas, each of which has the same characteristics of the location providers. In other words, as discussed in greater detail below, locations inside the same area have the same physical characteristics of Gps and Net.

In some embodiments, the profiles are read into the memory whenever the instance of LocationManager is created. The data are stored in a list of Areas. In some embodiments, to reduce false negatives, sensing substituting 881 uses two locations to decide the current area: the immediate previous location and the current location. For each dynamic-selection invocation, if both locations are inside the same area, and the moving directions and speed suggest that the user will be in this area for a while, then the area is determined to be the current area. Specifically, in some embodiments, given a location, all areas that contain both locations are extracted. These areas are candidate areas for the determination of the most appropriate area. In some embodiments, the determination is based on the number of visits and the most current visit time. After the single area is determined, then it chooses the most appropriate provider based on the profiled area characteristics.

Sensing Suppressing Embodiment

In some embodiments, the Sensing Suppressing component 582 monitors the user's context with other non-energy-intensive sensors such as accelerometers and orientation sensors. When the user is in a state where location-sensings can be suppressed, sensing suppressing 582 can save energy by suppressing the location sensing.

FIG. 5B illustrates one embodiment for Sensing Suppression Module 88. Specifically, when LBAs 847 are running and the location services are registered, sensing suppressing 882 creates a thread to detect whether the phone is in static or moving state. If the current state is static, then sensing suppressing 882 removes the previous registration; if not static, then it registers the previous sensing request again (lines 8-12 of FIG. 5B). In some embodiments, the thread is invoked periodically (e.g., every 1 minute) and the reading for each invocation lasts for several seconds. The reason for doing so rather than continuous monitoring is that otherwise the continuous sensor reading and computation become expensive in terms of energy consumption.

In the embodiment shown in FIG. 5B, inside the thread, sensing suppressing keeps reading accelerometers and orientation sensors to detect mobility (lines 1-7 of FIG. 5B). Whenever there is change of the state, these sensors will typically experience significantly changed values. In some embodiments, the user state is detected to be static only when both microscopic (e.g., two neighboring readings) and macroscopic (e.g., 5 second) changes are not detected. Microscopic state is determined by finer successive sensor readings, while macroscopic state is determined by coarser reading changes (e.g., 2 second).

Furthermore, in some embodiments, to reduce the false negative (i.e., mobility being detected as being static) probability, if no mobility is detected, then the user state is considered to be transiently static, and this state has to be maintained for some time before inferring that the user is being static.

Sensing Piggybacking Embodiment

For embodiments supporting both Gps and Net mechanisms, LBAs can request the location sensing by registering the sensing requests through a registration function call (e.g., requestLocationUpdates( )), and after that, future location updates will keep coming and invoking the callback function (e.g., on LocationChanges( )). The registrations can take several parameters including the desired location provider, update time interval and update distance interval. The time interval and distance interval indicate how often the location update should be received in temporal and physical dimensions. To save energy, the time and distance intervals are preferred to be large enough to allow sleeping of the sensing devices such as GPS.

As previously discussed, with multiple LBAs, the sleeping time could be small if the location sensing requests coming from different applications are not synchronized. Sensing Piggybacking 883 may be employed to force the incoming registration request to synchronize with existing location-sensing requests. Sensing Piggybacking 883 may be employed to predict the next sensing registration by existing LBAs 547, and asks the incoming LBA 547 to delay the registration. Specifically, in some embodiments, if the registration time for the next request is Ttime later, then the incoming request will be delayed for Tso that one request can be saved, and the sensing device can potentially have more time in sleep mode.

In order to perform piggybacking, sensing piggybacking 883 learns and maintains the location sensing registration history. The registration states are maintained with two array lists, one for Gps and the other for Net. Each element of the lists contains three members: registration time, registration time interval and registration distance interval.

Sensing piggybacking 883 also needs to determine the validity of the maintained states. Specifically, since any prediction of future registration is based on historically maintained states, the state might be invalid when the maintained states are outdated because the requesting LBAs 547 may stop running or stop registering. In some embodiments, when a new registration comes, sensing piggybacking 883 first checks whether the maintained state is valid. A state is valid only when the most recent registration time recorded is no more than some time older than the current system time. The default threshold value for the first condition is 4, and the default threshold value for determining the second condition is 2. If the predicted request which is supposed to occur after T time does not come in 2T time, then the state is invalid, indicating either the application changed the registration pattern or the application has stopped running.

FIG. 6C illustrates an embodiment, where Sensing piggybacking 883 hooks into the registerLocationUpdate( ) function of the LocationManager Class of Android Framework. When receiving the above function call, sensing piggybacking 883 checks the validity of the maintained registration state (lines 1-2 of FIG. 6C). If the state is invalid, the request is passed through and is added to the registration history. If the state is valid, then sensing piggybacking 883 will determine the piggybacking time (i.e., the delay) with getPiggyTime( ) function (lines 4-16 of FIG. 6C). In some embodiments, sensing piggybacking 883 determines the piggybacking time in six different usage scenarios based on the currently registration states types and the incoming new registration type. Specifically, in some embodiments, the currently maintained state types can be Gps only, Net-only, or both Gps and Net. The incoming new request can be Gps-request or Net-request.

In some embodiments, sensing piggybacking 883 operates as follows in the following six scenarios. For simplicity, (Maintained states, Incoming state) denotes each scenario. Also, (t, $T_0$, $D_0$) denotes the incoming request, t is the incoming request time, T0 denotes the requested update time interval, and D0 denotes the requested distance interval. For the maintained state, (Gps, $T_1$, $D_1$) denotes the Gps state with the finest time interval being $T_1$ and finest distance interval being $D_1$. Further, (Net, $T_2$, $D_2$) denotes the Net state with the finest time interval being $T_2$ and the finest distance interval being $D_2$.

({Gps}, Gps): Sensing piggybacking 883 checks whether the state of (Gps, $T_1$, $D_1$) is valid. If so, then it compares ($T_1$, $D_1$) to ($T_0$, $D_0$). If $T_1<T_0$ and $D_1<D_0$, then piggybacking is enabled, and the piggybacking time is calculated.

({Gps}, Net): As Net has coarser location information than Gps, the operations are similar to the ({Gps}, Gps) scenario, but the comparison is between ($T_2$, $D_2$) and ($T_0$, $D_0$).

({Net}, Net): similar to (Gps, Gps) case by replacing Gps by Net.

({Net}, Gps): Since Gps is finer than Net, the request cannot be piggybacked on existing Net state, so the registration is passed immediately without performing piggybacking.

({Gps, Net}, Gps): Sensing piggybacking 883 checks the Gps state only. The process is similar to that of ({Gps}, Gps).

({Gps, Net}, Net): Sensing piggybacking 883 firstly checks the Net state, which is similar to that of ({Net}, Net). If not possible to piggyback, then it checks the Gps state, and the process is similar to that of ({Gps}, Net) scenario.

Sensing Adapting Embodiment

FIG. 7B illustrates one embodiment of Sensing adapting 884, when a LBA 847 is started and requests location sensing. Specifically, when the battery level is below a user-specified threshold (e.g. 20%), Sensing Adapting 884 determines the preferred adaptation degree for both time and distance intervals of Gps registrations (lines 1-3). When the battery level is low, the location manager 848 also asks the user whether to perform Sensing Adapting or not. If adaptation is enabled, the user can then choose the preferred adaptation degrees. In some embodiments, the device then functions based on the decision and values input by the user.

Sensing Adapting 848 acquires the battery information including the current battery level. Broadcast Receiver 885 handles the intent of ACTION_BATTERY_CHANGED. In some embodiments, the function used to register is registerReceiver( ) which is a method of the Context class in Android SDK. Because of this, Sensing Adapting 848 piggybacks the registration on an existing application in Android platform: SecuritySettings, which is extended from Context. Specifically, in some embodiments, in the on Create( ) method, SecuritySettings registers the BroadcastReceiver and an IntentFilter. In some embodiments, whenever the battery level changes, the receiver is notified and appropriate information is recorded.

In some embodiments, Applications running on Android platforms are essentially independent in the sense that each application has a private directory and each application runs in a separate java virtual machine. For communications between activities within a single application, and between different applications, Android SDKs provide several mechanisms including shared preferences, content providers, database, and system properties. Unfortunately, none of these mechanisms works for the communication between application layer and framework layer. In some embodiments, files are used as the intermediate media for these two layers to communicate. Specifically, applications and frameworks both access the same files under the data directory of the system, which can be obtained by getDataDirectory( ) call.

There are various types of data that are shared. For simplicity, a separate file may be used for each type of data. The reading and writing functions may be implemented at Framework layer, inside the BatteryState class. Specifically, the class provides two types of methods: get( ) and set( ), to read and write the interested information, respectively.

Mobility Profiling

In some embodiments, the design elements of sensing suppressing and sensing substituting (dynamic selection) use an area data structure (e.g., M-Area or Z-Area) to organize the locations. Each area has several types of properties. (i) Boundary-related properties. Essentially each area is a rectangle area bounded by a starting point, an ending point, and a width. The points are specified with latitude and longitude coordinates. (ii) Usage-related properties. The area also contains the number of visits and the last visit time. (iii) Motion-related properties. For later usage of sensing suppressing, each area has the same activity pattern (walking, driving, staying), confidence (known, unknown), speed (constant, varying); (iv) Location-Provider-related properties: It also contains two SensingCharacter (gps and network) and an ActivityState instances; The SensingChracter has three members: availability, accuracy and precision; ActivityState has three members: activity, pattern, and speedstate.

Figure 10:
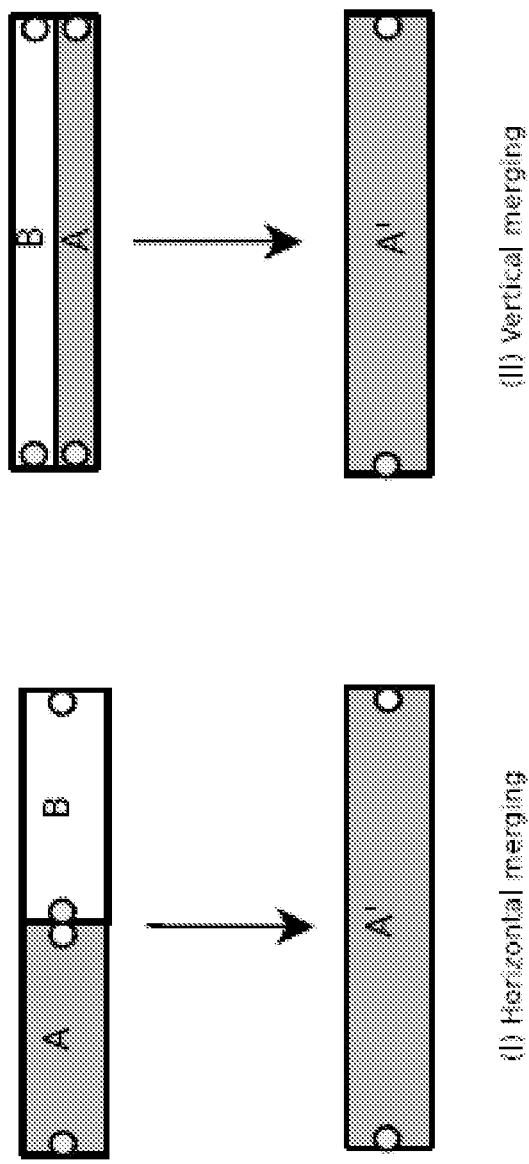
FIG. 10 illustrates an embodiment of merging that may be employed for an embodiment of the mobile device of FIG. 2, in accordance with aspects of the present invention.

Initially, each area is a rectangle constructed based on the two neighboring location readings from the mobility traces. Later, areas can be merged, as illustrated in FIG. 10. There are two types of merging scenarios: Horizontal and Vertical. Horizontal merging occurs when the starting point of one area is adjacent to the ending point of the other area or the starting point is inside of the other area. Vertical merging occurs when the two neighboring areas have adjacent starting points and ending points. The conditions of merging are the two areas are adjacent to each other and the motion-related and Location-provider-related properties are the same. When the conditions are met, merging is performed and the properties of the new area are updated. Specifically, the starting, ending points and the width are updated to represent the new area. The LastTime is updated to the more recent LastTime of the previous two areas, and the Frequency is set to be the average of the two Frequency values. The basic operations of these two types of merging are shown in FIG. 10.

Since the size impacts the efficiency of processing speed and suppression effectiveness, there is a performance tradeoff with regard to the number of M-Areas maintained. Specifically, increasing the size results in higher suppression probability. However, it also occupies more storage space and inflates the processing time. Accordingly, the size can be adjusted based on the hardware capability of client device 200. If the client can afford to provide more space and process the operations sufficiently fast, maintaining in general more areas benefits Sensing Substitution. In addition, replacement mechanism that only maintain higher-utility areas can be easily applied to alleviate the storage concern and maintain scalability. The prioritization is enforced in the following order: Frequency, LastTime, and Area size.

Performance Evaluation

Various embodiments of the invention described above are evaluated through experiments by applying each of the four design principles. The energy savings are expressed in the amount of energy saved per unit of time and the expected time when performing typical tasks such as making calls on smartphones. The effectiveness of each design principle is demonstrated by considering scenarios where the design principle operates. GPS usage is monitored in these scenarios by presenting both the number of GPS invocations and GPS sleeping time. Additionally, the four design principles are integrated and used to show the aggregate effectiveness of the embodiments described above.

Analysis

According to one aspect of the invention, the amount of energy consumed by GPS invocation is quantified. A typical invocation of GPS sensing consists of a set of operations including satellite locking and continuous GPS reading, and the typical duration of one GPS invocation, as verified previously, is about 15 seconds.

Assuming the energy cost (i.e., in unit of Joule) of per-GPS sensing is Eg, and, similarly, En for the energy cost of per-Net sensing. The saved energy can be expressed in unit of Joule, or for a more concrete understanding, be translated into the extended battery life when performing other tasks. Specifically, the representative tasks of making phone calls are chosen, the power consumption level of which is denoted by Pc.

The energy-saving benefits of the four design principles are now analyzed with respective assumptions. For simplicity, it is assumed that default LBAs request the number of r GPS sensings per hour. Es is used to denote the amount of saved energy by each design principle in 1 hour, and Tc is used to denote the extended operation time when making calls.

Sensing Adapting: Assuming the time-interval adaptation degree is $d_t(\%)$, it is given that, $$E_s = r\left(1 - \frac{100}{d_t}\right)E_g, \text{ and} \quad (1)$$

$$T_c = \frac{r(d_t - 100)E_g}{d_t P_c} \quad (2)$$

Sensing Suppressing: Assuming $p_s$ percentage of GPS sensing are suppressed, it is given that, $$E_s = rp_s E_g, \text{ and } T_c = \frac{rp_s E_g}{P_c}$$

Sensing Piggybacking: Assuming $p_p$ percentage of otherwise-independent GPS sensing can piggyback on other sensings, these sensings, if not piggybacking on other sensing, would trigger separate GPS sensings. It is given that, $$E_s = rp_p E_g, \text{ and } T_c = \frac{rp_p E_g}{P_c}$$

Sensing Substituting: Assuming $p_u$ percentage of GPS sensing are replaced by NET sensing, it is given that, $$E_s = rp_u(E_g - E_n), \text{ and } T_c = \frac{rp_u(E_g - E_n)}{P_c}$$

Some exemplary values based on experiments and assumptions are shown hereinafter. The measurements show that each GPS sensing costs about 9 joules (i.e., 150 mA*4V*15 seconds), and the power level of making phone calls is about 300 mW. For a typical MBA of requesting Gps every half minute, r=120. Thus, with Sensing Adapting and dt=3, the energy saved per hour is Es=120*⅔*9=720 (joules) with Equation 1. It can be shown that Tc=720/0.3=2400 (seconds) in Equation (2). In other words, with Sensing Adapting, for every hour of running a LBA, about 40 minutes of phone-call time can be saved. Similarly, the benefits of performing other design principles can be demonstrated. For instance, with ps=50 (i.e., 50% of requests are suppressed), it can be shown that Tc=540 (joules), and Tc=1800 (seconds).

Sensing Suppressing

Sensing Suppressing Module 882 is invoked when the phone is in static. Now consider a scenario where a LBA is running and the user varies mobility states between being static and moving. The state-checking thread is invoked every 1 minute, and the LBA-checking thread is invoked every 2 minutes. The various events are recorded in FIG. 11(*a*). In the figure, an example scenario is used to show the invocations of two threads, the actions taken by the two threads, the starting and stopping of the application, and the user moving. Specifically, initially the phone is static. After an LBA starts, the LBA-checking thread detects the running of the application and invokes the accelerometer. After that, the accelerometer readings are used to detect the phone mobility state. Since the phone is not moving, after a while the state-checking thread puts the phone into suppressing state. When the phone starts moving, the state-checking thread detects the mobility and takes the phone out of suppressing state. Finally, after the application stops, the LBA-checking thread detects that and unregisters the accelerometer.

Figure 11:
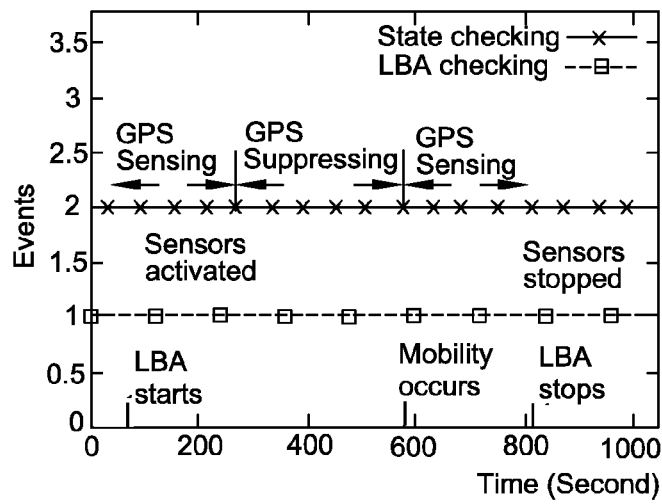
FIGS. 11(a), (b), and (c) illustrate experimental results of invoking the Sensing Suppressing module depicted in FIG. 8.
Figure 11:
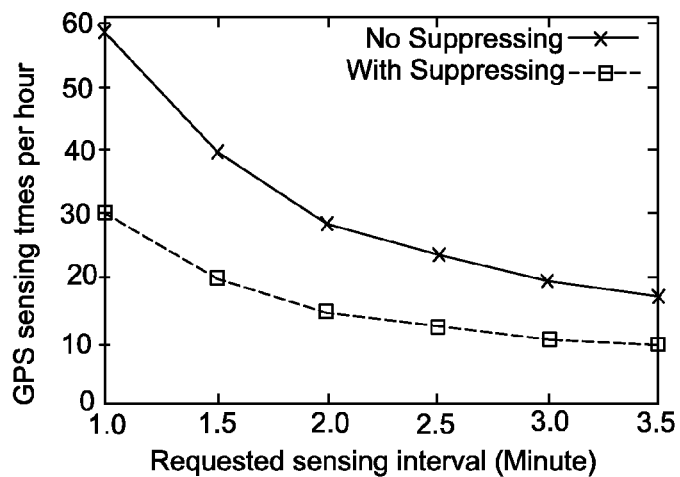
Figure 11:
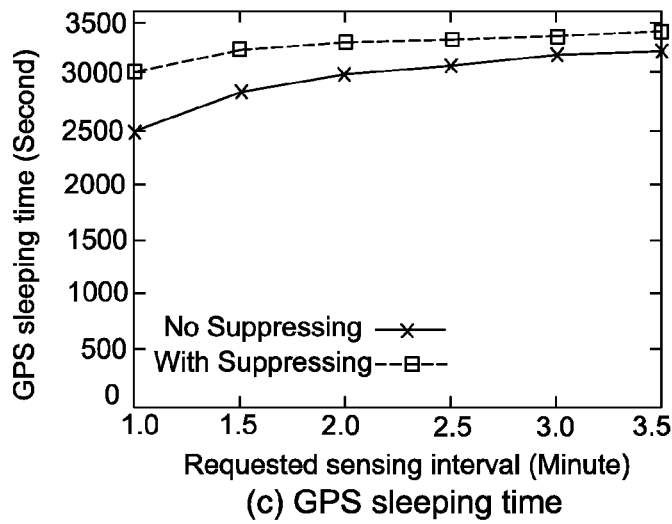

FIGS. 11 (*b*) and (*c*) show the GPS usage with varying GPS sensing intervals requested by LBAs. The phone is put into static state for half of the time (i.e., 30 minutes in an hour). With an assumption of 5-second locking time preceding GPS sensing, the estimated GPS sleeping time is plot in FIG. 11(*c*). Sensing Suppressing module 882 effectively suppresses about half of the GPS sensing, which increases the GPS sleeping time by up to 20% in these scenarios.

Sensing Piggybacking

Figure 12:
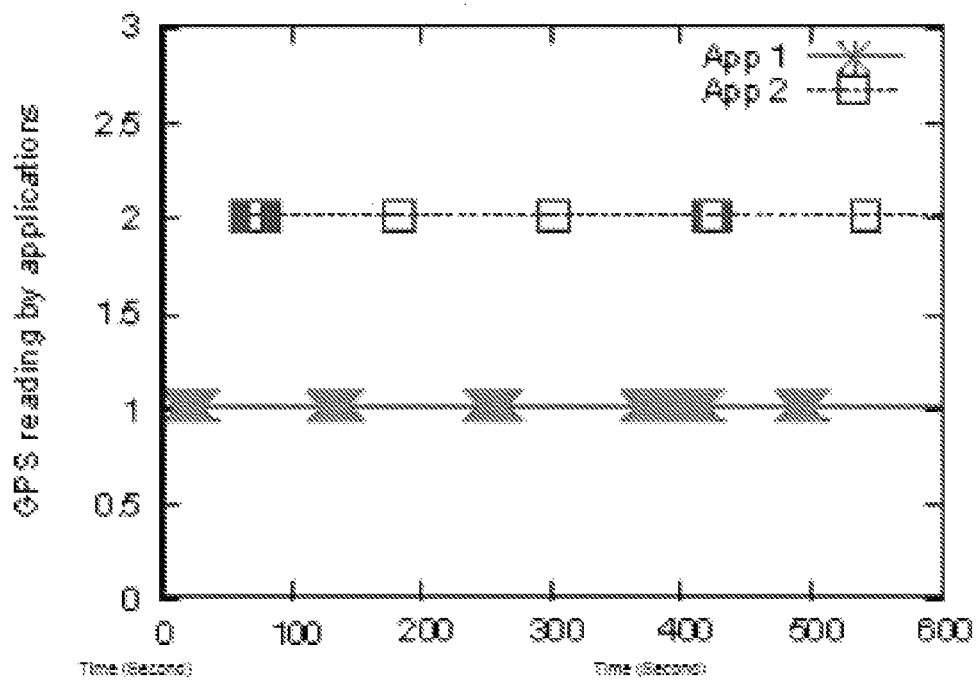
FIGS. 12(a) and (b) illustrate the scenarios for evaluate the Sensing Piggybacking module depicted in FIG. 8.
Figure 12:
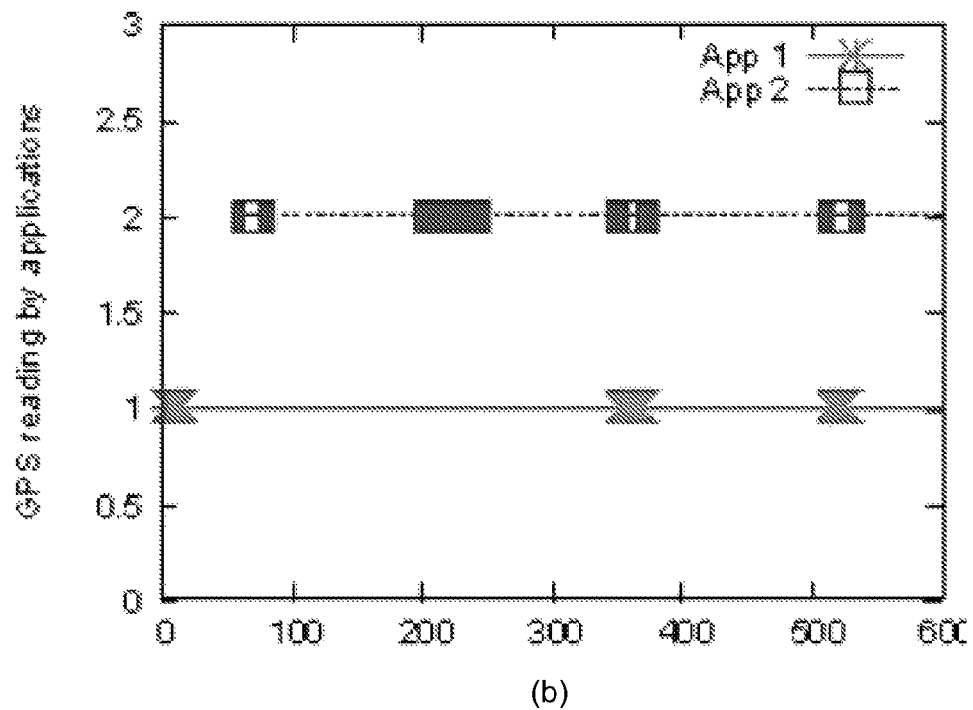

Sensing Piggybacking module 883 can help reduce the number of GPS invocations by piggybacking GPS sensing requests of multiple LBAs. Two LBAs are executed concurrently but with different starting time. Both applications are requesting GPS sensing every 2 minutes. FIGS. 12 (*a*) and (*b*) show the sensing updates received by the two applications. FIG. 12 (*a*) shows the scenario where Sensing Piggybacking module 883 is not invoked, while FIG. 12(*b*) shows the scenario where the module is operating. They show that in the first scenario, GPS is invoked all 10 times in 10 minutes, whereas in the second scenario it is only invoked 6 times. Note that in FIG. 12(*b*) the last two GPS invocations notify both applications about the new location updates.

Figure 13:
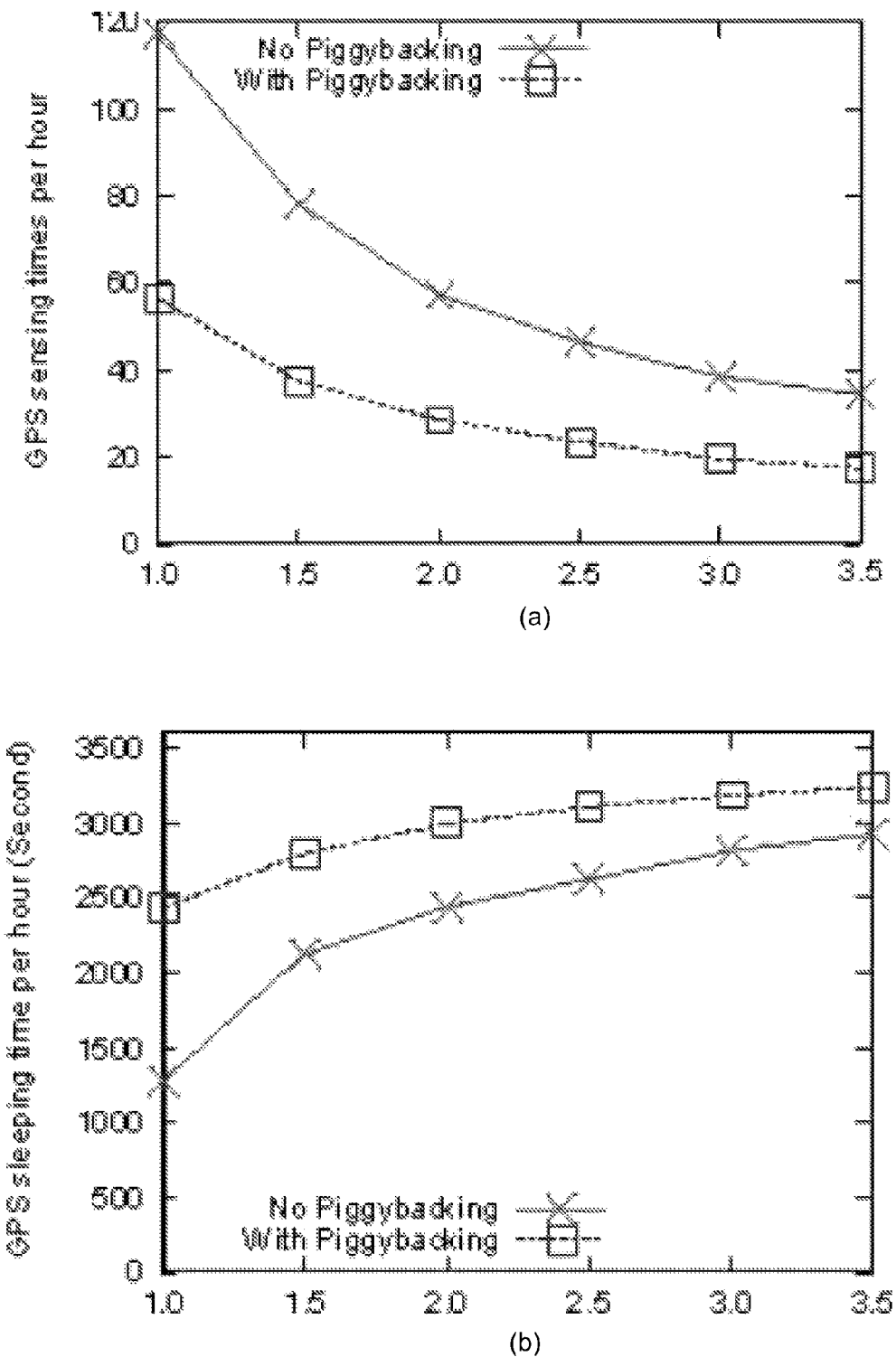
FIGS. 13(a) and (b) illustrate experimental results of invoking the Sensing Piggybacking module depicted in FIG. 8.

FIGS. 13(*a*) and (*b*) show the GPS usage in terms of both invocation times and sleeping time. The GPS requesting frequencies of LBA applications are varied from every 1 minute to every 3.5 minutes. With Sensing Piggybacking module 883 invoked, the number of GPS invocations is reduced by half, and correspondingly, the GPS sleeping time is increased by up to two times.

Sensing Substituting

Sensing Substituting module 881 is evaluated in an experiment where a user carrying a phone walks for about 7 minutes along a route. The route is split into four areas with different properties of Gps and Net characteristics. For ease of evaluation, the characteristics of the four areas are set as follows. In Area 1, both Gps and Net are working, with Net being much less accurate than Gps. In Area 2, both Gps and Net are working, with Net having similar accuracy as Gps. In Area 3, only Gps is working. In Area 4, only Net is working.

An LBA is executed on the phone, requesting Gps sensing updates of every 5 seconds. The substituting checking thread uses an interval of 15 seconds. The events of sensing substituting and location updating are recorded and shown in FIG. 14 (*a*). As shown in the figure, in Area 1, Gps is used to perform location updating. As the user moves into Area 2, since Net has similar accuracy as Gps and has less energy cost, Gps is replaced by Net to provide location sensing. Then as the user moves into Area 3, since only Gps is available, the component substitute Gps for Net. Finally, when in Area 4, since only Net is working, Net again replaces Gps to perform location sensing.

Figure 14:
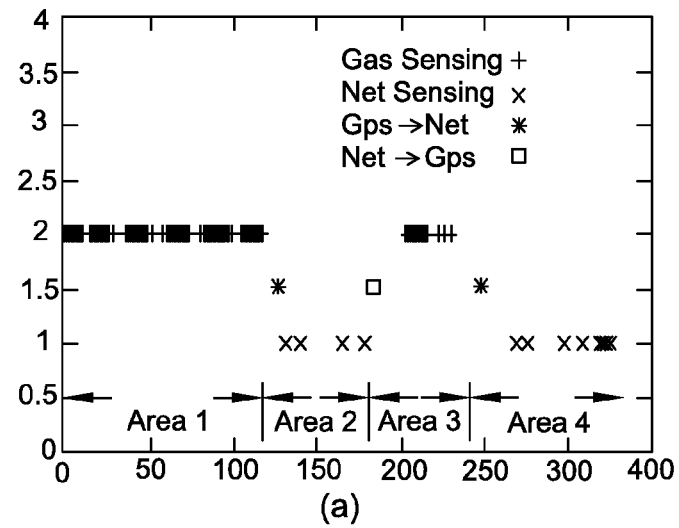
FIGS. 14(a), (b) and (c) illustrate experimental results of invoking the Sensing Substituting module depicted in FIG. 8.
Figure 14:
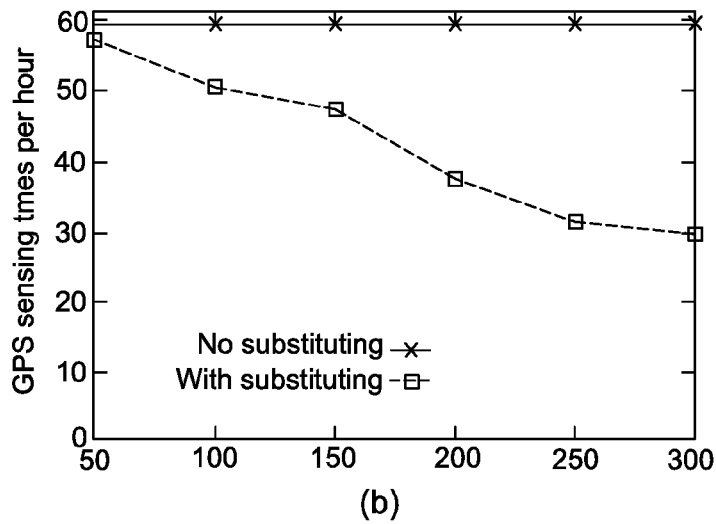
Figure 14:
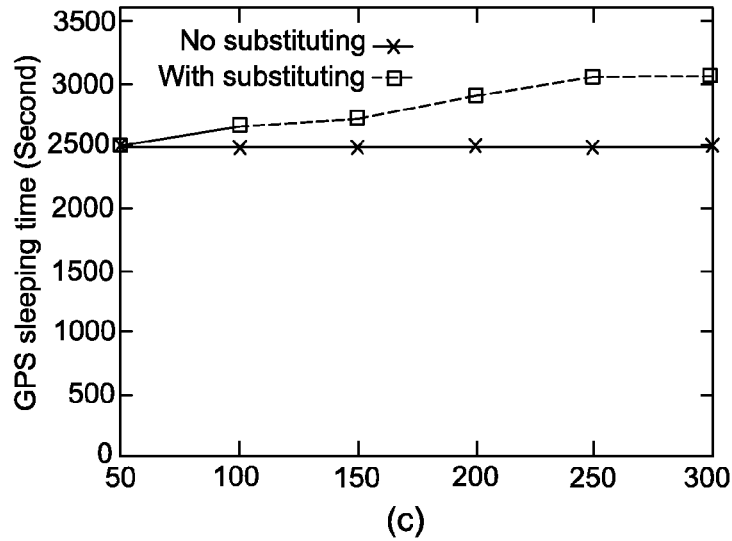

FIGS. 14(*b*) and (*c*) show the GPS invocation times and sleeping time. Since Sensing Substituting module 881 replaces GPS by Net when Net has the desired location sensing accuracy, so in order to test the module, the location accuracy required by LBAs is varied from 50 meters to 300 meters. The Net accuracy is set according to the traces collected from a particular user who commutes along a walking route. The user lives and works in Bay Area of California, USA. As shown in FIG. 14, with coarser requirements, GPS invocation times decrease. While 50-meter accuracy requirement does not see much improvement in terms of GPS invocation times, 300-meter requirement effectively reduce the invocation times by about 50%. Correspondingly, the GPS sleeping time also increases as accuracy requirements become coarser.

Sensing Adapting

Figure 15:
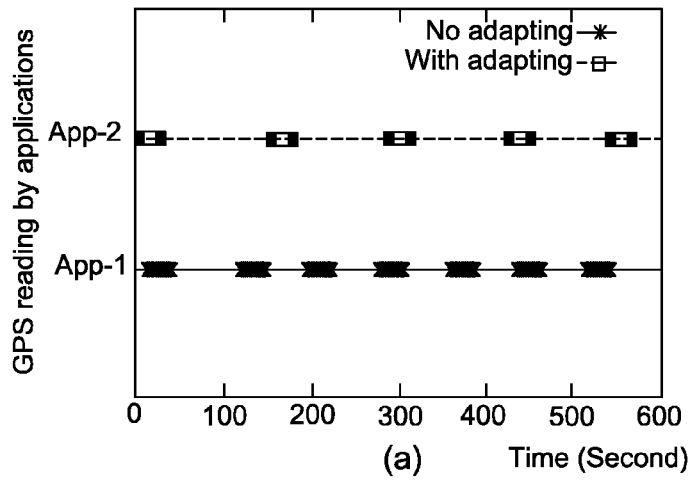
FIGS. 15(a), (b) and (c) illustrate experimental results of invoking the Sensing Adaptation module depicted in FIG. 8.
Figure 15:
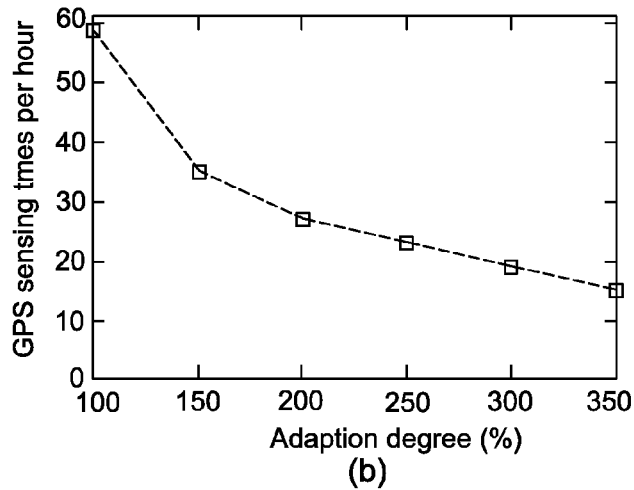
Figure 15:
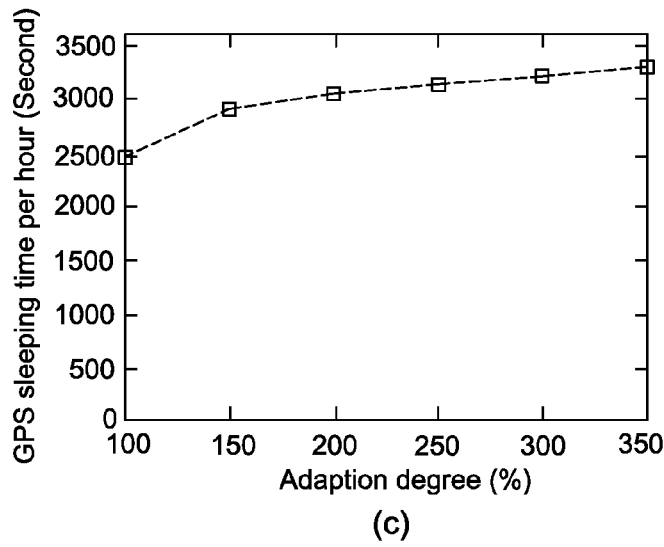

Sensing Adapting module 884 is invoked when the battery level is below certain threshold. When working, it adapts the update intervals of time and distance of location sensing. An LBA is executed at low battery level, and the adaptation degree for time is fixed to 200, i.e., dt=200. Both scenarios with different battery levels are considered. In the high-battery-level scenario, Sensing Adapting module 884 is not invoked, while in the low-battery-level scenario it is invoked. The results for both scenarios are shown in FIG. 15(*a*). The Gps location updates received by the applications are plotted in the figure. As shown, the LBA requests the location sensing updates every 1 minute, and with this component, the update interval is increased to every 2 minutes.

FIG. 15(*b*) shows the GPS sensing times. The adapting degree is varied from 100% (i.e., without Sensing Adapting) to 350%, and the number of GPS sensing invocations is plot for the first hour. The figure shows that no-adapting results in about 60 times of GPS sensing, as requested by the applications. Higher adapting degree results in less number of GPS sensing updates, and specifically, with dt=350, GPS is only invoked 15 times. Less invocations lead to longer sleeping time of GPS, which contributes to energy saving, as shown in FIG. 15(*c*). The figure further shows that Sensing Adapting module 884 causes GPS sleep more often, and with dt=300, GPS can sleep for about 50% more time.

Integrated Results

Figure 16:
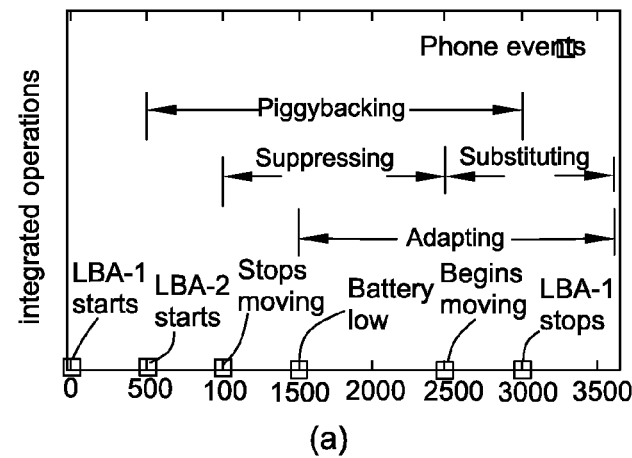
FIG. 16(a) shows the exemplary scenarios for testing the integrated system depicted in FIG. 8.
FIGS. 16(b), and (c) show the GPS usage when the integrated system is tested in the scenarios shown in FIG. 16(a)
Figure 16:
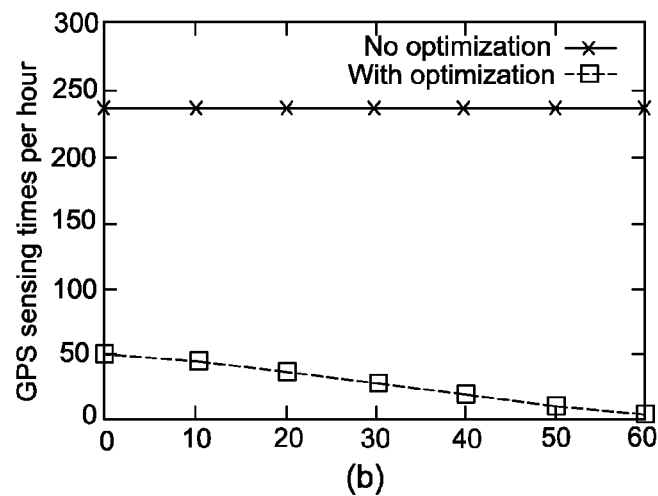
Figure 16:
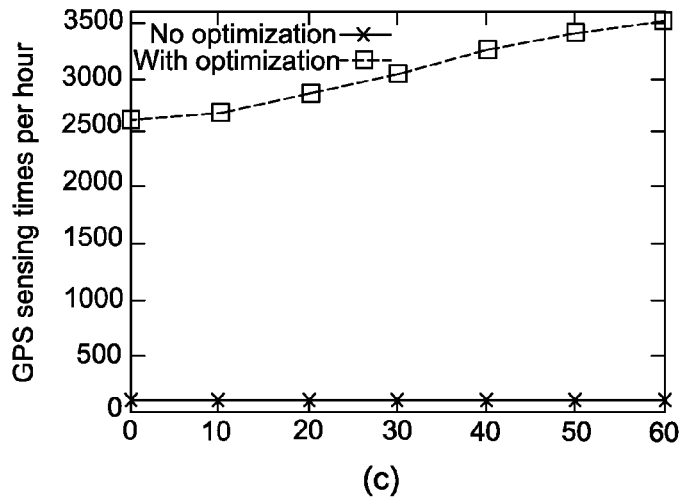

According to further embodiments, the four components can work together for better energy saving in various scenarios. The integrated operations for an exemplary scenario are shown in FIG. 16(*a*). As shown in the figure, initially the battery level is high and the user starts LBA-1. After another LBA is started, Sensing Piggybacking module 883 is operating. When the user becomes static, Sensing Suppressing module 882 begins to work. When the battery level becomes low, Sensing Adapting module 884 comes into play. As the user starts moving, Sensing Suppressing module 882 is stopped and Sensing Substituting module 881 is invoked when necessary.

To further demonstrate this embodiment, two LBAs are executed concurrently when the battery level is low to enable corresponding components of Battery-aware Adaptation and Sensing Piggybacking. The adapting degree is set to be 200%. The two LBAs are requesting GPS sensing with same frequency of every 30 seconds, but are started with 15-second difference. Traces are collected from a particular user who commutes along a route and the user states are varied to invoke the Sensing Suppressing module 882. Specifically, the time length of the user being static is varied. The GPS usages are plotted in FIGS. 16(*b*) and (*c*). By default, GPS is invoked about 240 times per hour. By invoking all the four components, GPS invocations can be reduced to about one-fifth even when the phone is constantly moving (i.e., Sensing Suppressing is not invoked). Even more significant reduction on the number of GPS invocations can be achieved when the phone is put in longer static state. For the GPS sleeping time, running two LBAs with such frequent GPS requests practically put the phone into awake state all the time by default. With our prototype, GPS sleeping time can become more than 2500 seconds for all considered scenarios.

Figure 17:
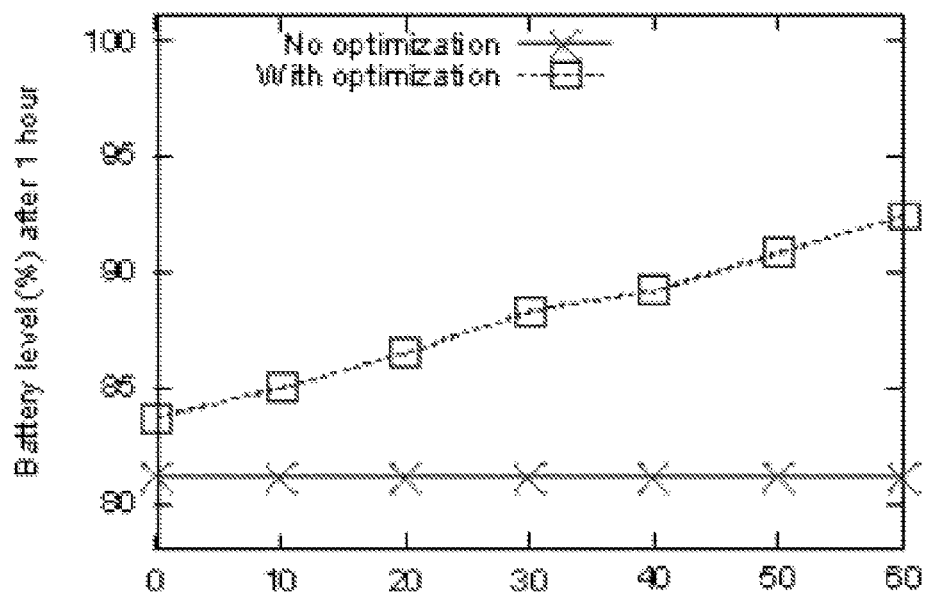
FIGS. 17(a) and (b) show the comparison of energy saving between the integrated system shown in FIG. 8 and a conventional system.
Figure 17:
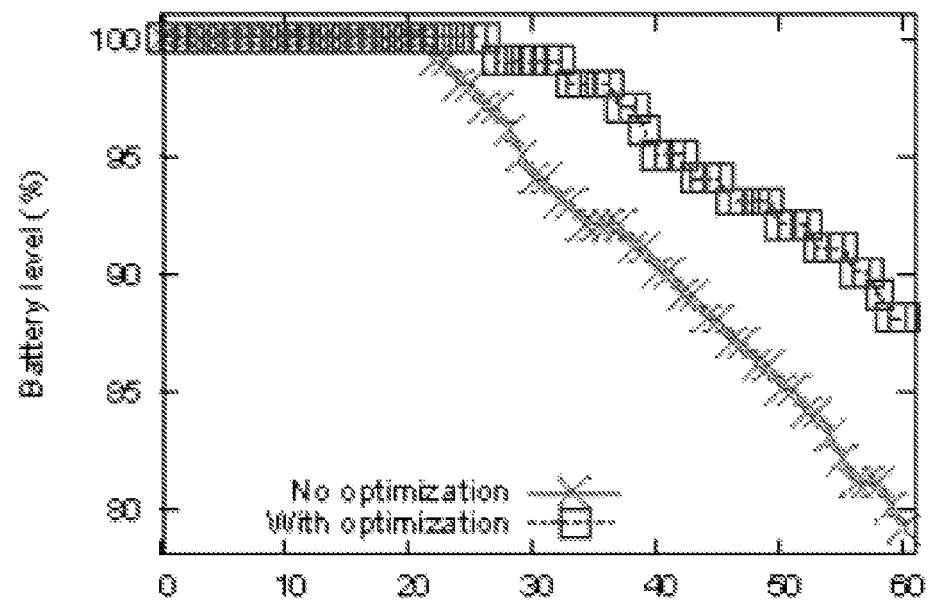

Though the above evaluation results show the savings in terms of GPS invocation times and GPS sleeping time, it is also necessary to show the direct energy saving results in terms of the improved battery life since operating the design components also consumes (computation) power. The following scenario is used to show the improved battery life with our prototype. Two LBAs are executed with each requesting GPS sensing every 1 minute. The two LBAs are started at different time with 30-second difference. To show the effect of Sensing Adapting, the component are invoked for all battery levels, i.e., the battery level threshold is set to 100%. A user carries the phone and walks along the commuting route with different moving/static time. The results are shown in FIG. 17(*a*). It is shown that the embodiment can improve the battery life from 81% to up to 92% after a hour.

In another embodiment with a "Real time traffic" application used to measure the effectiveness of the modules, the user carrying the phone follows the commuting route and spends half time walking and half time being static. The instantaneous battery level results are shown in FIG. 17(*b*). It shows that the integrated system can improve the battery life from 79% to 88% after one hour.

Profiling Results

Figure 18:
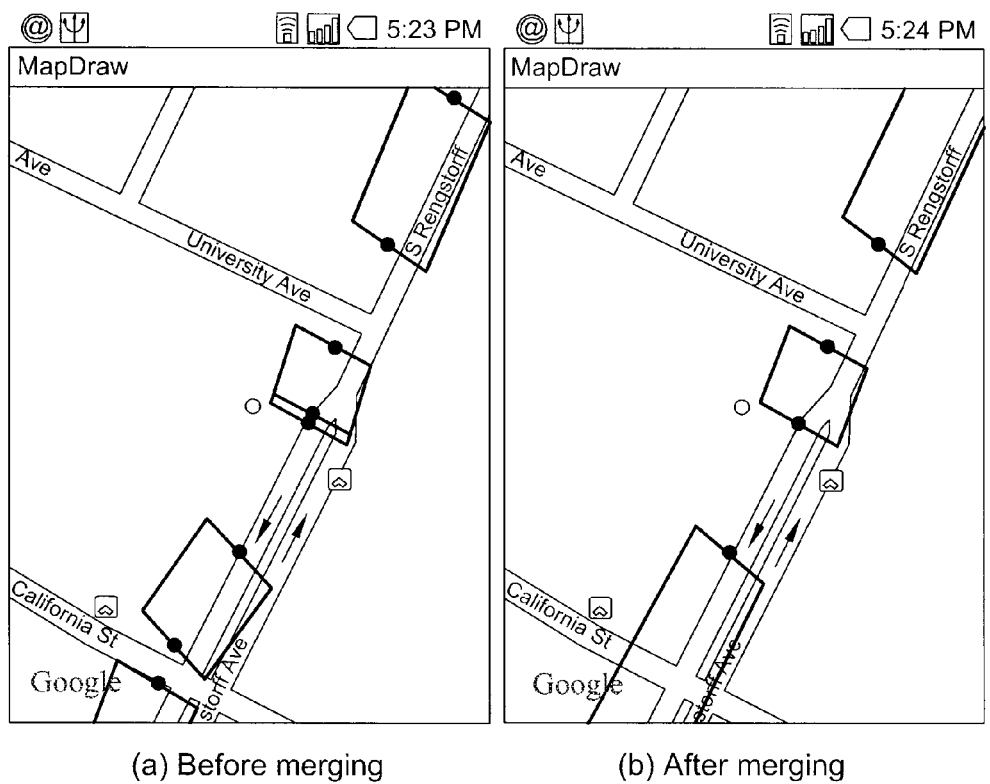
FIG. 18 shows the location-sensing profiler (a) before area merging and (b) after area merging.

To evaluate the Location-Sensing Characteristics Profiler (LSCP), another experiment is carried out, where a user carries the Android phone and executes an application to continuously obtain the user's location information on a daily basis. The user lives and works in Bay Area of California, USA. The LSCP is evaluated by presenting the maps of the Areas both before and after the merging operations as shown in FIG. 18. It is shown that there are a total of 5 Areas before merging and the merging results in 3 new Areas.

Figure 19:
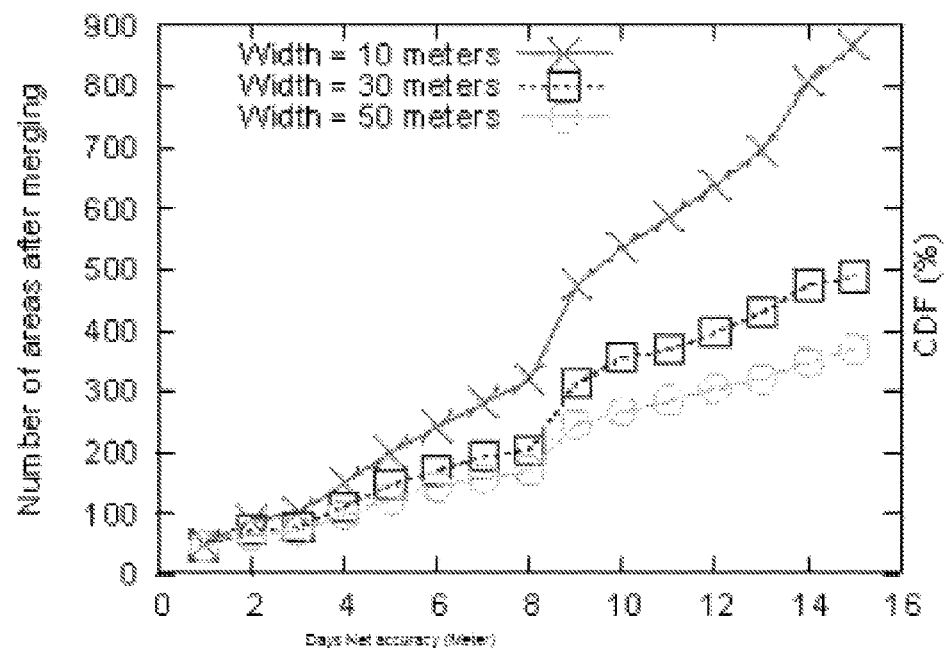
FIG. 19 shows the evaluation results of the location-sensing profiling conducted in an experiment.

The profiling process has several pre-defined parameters for extracting and merging Areas. One of the parameters is the initial width of extracted Areas. The setting of width value particularly affects the merging operations since only two Areas that are adjacent to each other can be merged. A larger width value encourages merging and leads to smaller Area sets, while the accuracy of the Area extraction might be compromised since all the locations inside the same Area are supposed to have the same location-sensing characteristics. As shown in FIG. 19, setting width to 10 meters rather than 30 meters increases the resulting Area set by more than 70%.

Figure 20:
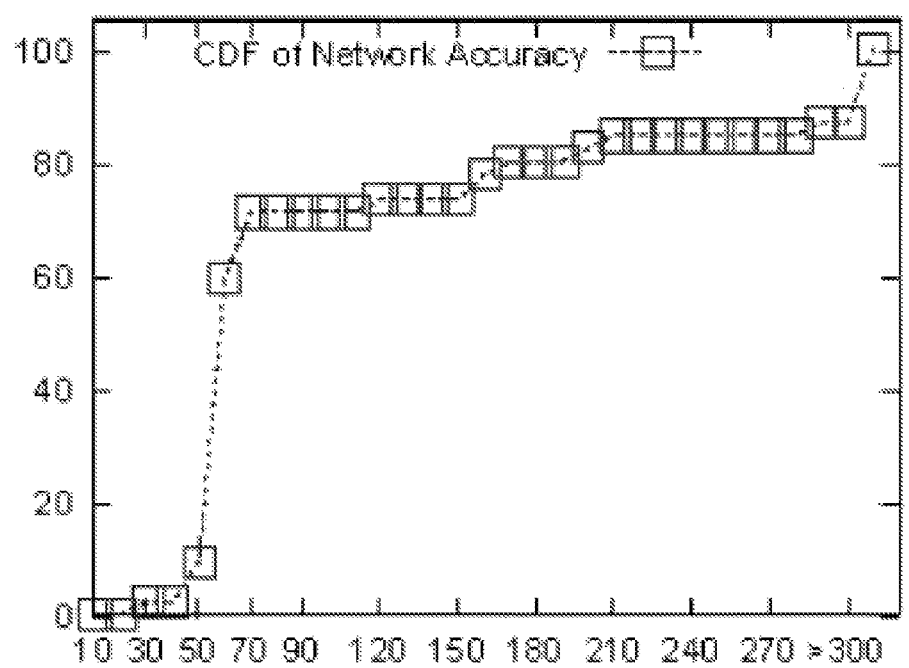
FIG. 20 shows the cumulative distribution function (CDF) of network accuracy in the location-sensing profiling.

The Net accuracy of the locations is also measured. The cumulative distribution function (CDF) values are shown in FIG. 20, which shows that for the locations visited by the user, more than 70% of the locations have a Net-accuracy less than 100 meters. These results suggest that for a LBA requiring location accuracy coarser than 100 meters, Sensing Substituting module 881 can be invoked for most of the time.

The above specification, examples, and data provide a complete description of the manufacture and use of the composition of the invention. Since many embodiments of the invention can be made without departing from the spirit and scope of the invention, the invention also resides in the claims hereinafter appended.

What is claimed is:

1. A method for managing a location sensing operation for at least one location-based application executed on a portable device, comprising:
    activating a first sensor disposed in the portable device so as to provide the location sensing operation requested by the at least one location-based application;
    periodically determining whether the portable device is moving by a second sensor disposed in the portable device;
    suppressing the location sensing operation of the first sensor in response to determining that the portable device is not moving by the second sensor; and
    determining a confidence value associated with a current mobility profile of the portable device, wherein the confidence value is based at least in part on whether a current location or route is a location or route that is frequently traversed by the portable device;
    wherein the length of an interval for which the location sensing operation is suppressed is based on the determined confidence value.

2. The method of claim 1, wherein the second sensor has a power consumption lower than that of the first sensor.

3. The method of claim 2, wherein the first sensor is a global positioning system (GPS) sensor.

4. The method of claim 2, wherein the second sensor is an accelerometer.

5. The method of claim 1, wherein determining whether the portable device is moving comprises:
    comparing a first set of sensor readings provided by the second sensor at a first time interval;
    comparing a second set of sensor readings provided by the second sensor at a second time interval, wherein the second time interval includes a plurality of the first time intervals; and
    determining the first set of sensor readings has a first variation below a first threshold and the second set of sensor readings has a second variation below a second threshold.

6. The method of claim 5, wherein the first set of sensor readings includes at least two consecutive sensor readings collected at the first time interval and the second set of sensor readings is selected from the first set of sensor readings.

7. The method of claim 5, wherein the first and second thresholds are to each other.

8. The method of claim 1, wherein suppressing the location sensing operation of the first sensor further comprises deactivating the first sensor.

9. The method of claim 1, wherein suppressing the location sensing operation of the first sensor comprises unregistering the first sensor.

10. The method of claim 1, further comprising:
    detecting the portable device has movement; and
    activating the first sensor.

11. The method of claim 10, wherein detecting the portable device has movement further comprises:
    comparing a set of sensor readings provided by the second sensor at a first time interval; and
    determining the set of sensor readings has a variation that is over a threshold.

12. The method of claim 10, wherein the at least one location-based application has a location sensing requirement, the method further comprising:

suppressing the location sensing operation of the first sensor when the location sensing requirement of the at least one location-based application is lower than a predetermined requirement.

13. The method of claim 1, further comprising verifying the status of the portable device when the location sensing operation of the first sensor is suppressed.

14. A portable device for providing at least one location-based application, comprising:
- a digital processor configured to execute at least one location-based application, the location-based application requesting a location sensing operation;
- a first sensor configured to execute the location sensing operation requested by the at least one location-based application; and
- a second sensor configured to periodically determine whether the portable device is moving;
- wherein the digital processor is further configured to suppress the location sensing operation of the first sensor in response to determining that the portable device is not moving by the second sensor, and to determine a confidence value associated with a current mobility profile of the portable device, wherein the confidence value is based at least in part on whether a current location or route is a location or route that is frequently traversed by the portable device;
- wherein the length of an interval for which the location sensing operation is suppressed is based on the determined confidence value.

15. The portable device of claim 14, further comprising a memory configured to store computer executable codes of the at least one location-based application and to store sensor reading collected from the second sensor.

16. The portable device of claim 15, wherein determining whether the portable device is moving comprises comparing the sensor readings of the second sensor collected at a first time interval and comparing the sensor readings of the second sensor collected at a second time interval, wherein the second time interval includes a plurality of the first time intervals, and wherein suppressing the first sensor comprises deactivating the first sensor when the first set of sensor readings has a first variation below a first threshold and the second set of sensor readings has a second variation below a second threshold.

17. A non-transitory computer readable medium having computer readable codes stored thereon, the computer readable codes, when executed by a digital process disposed in a portable device, managing a location sensing operation for at least one location-based application, the computer readable codes comprising instructions for:
- activating a first sensor so as to provide the location sensing operation requested by the at least one location-based application;
- periodically determining whether the portable device is moving by a second sensor disposed in the portable device;
- suppressing the location sensing operation of the first sensor in response to determining that the portable device is not moving by the second sensor; and
- determining a confidence value associated with a current mobility profile of the portable device, wherein the confidence value is based at least in part on whether a current location or route is a location or route that is frequently traversed by the portable device;
- wherein the length of an interval for which the location sensing operation is suppressed is based on the determined confidence value.

18. The non-transitory computer readable medium of claim 17, wherein the instructions for determining whether the portable device is moving comprise instructions for:
- comparing a first set of sensor readings of the second sensor collected at a first time interval; and
- comparing a second set of sensor readings of the second sensor collected at a second time interval, wherein the second time interval includes a plurality of the first time intervals; and
- wherein the instructions for suppressing the first sensor further comprise instructions for:
- deactivating the sensing operation of the first sensor when the first set of sensor readings has a first variation below a first threshold and the second set of sensor readings has a second variation below a second threshold.

* * * * *